(12) United States Patent
Kim et al.

(10) Patent No.: US 11,354,156 B2
(45) Date of Patent: Jun. 7, 2022

(54) MASTER DEVICE FOR MANAGING DISTRIBUTED PROCESSING OF TASK BY USING RESOURCE INFORMATION

(71) Applicants: Samsung Electronics Co., Ltd., Suwon-si (KR); Seoul National University R&DB Foundation, Seoul (KR)

(72) Inventors: Kyungrae Kim, Suwon-si (KR); Hyeonsang Eom, Seoul (KR); Seokwon Choi, Seoul (KR); Yoonsung Nam, Seoul (KR); Hyunil Shin, Seoul (KR); Youngmin Won, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 237 days.

(21) Appl. No.: 16/585,364

(22) Filed: Sep. 27, 2019

(65) Prior Publication Data
US 2020/0218567 A1 Jul. 9, 2020

(30) Foreign Application Priority Data
Jan. 3, 2019 (KR) .................. 10-2019-0000889

(51) Int. Cl.
*G06F 9/48* (2006.01)
*G06F 9/50* (2006.01)
(52) U.S. Cl.
CPC ............ *G06F 9/4881* (2013.01); *G06F 9/505* (2013.01); *G06F 9/5044* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 2008/0235397 A1 | 9/2008 | Degenaro et al. | |
| 2016/0378570 A1* | 12/2016 | Ljubuncic | G06F 9/5027 718/104 |
| 2019/0007258 A1* | 1/2019 | Surcouf | G06F 9/5083 |
| 2019/0121660 A1* | 4/2019 | Sato | G06F 9/5088 |
| 2019/0155652 A1* | 5/2019 | Chou | G06F 9/505 |

FOREIGN PATENT DOCUMENTS

KR 10-1794696 B1 11/2017

* cited by examiner

*Primary Examiner* — Eric C Wai
(74) *Attorney, Agent, or Firm* — Jefferson IP Law, LLP

(57) ABSTRACT

A master device that manages task processing is provided and includes a communication circuit and at least one processor to obtain first real-time resource information associated with resources that a first task processing device currently uses obtain second real-time resource information associated with resources that a second task processing device currently uses, obtain information associated with processing of a distribution task to be distributed to at least one of the plurality of task processing devices, obtain an amount of resources required for processing the distribution task, identify the first task processing device to be a task processing device to which the distribution task is to be distributed on the basis of the first real-time resource information, the second real-time resource information, and the amount of resources required for processing the distribution task, and transmit the information associated with processing of the distribution task to the first task processing device.

18 Claims, 24 Drawing Sheets

MASTER DEVICE FOR MANAGING DISTRIBUTED PROCESSING OF TASK BY USING RESOURCE INFORMATION

CROSS-REFERENCE TO RELATED APPLICATION(S)

This application is based on and claims priority under 35 U.S.C. § 119(a) of a Korean patent application number 10-2019-0000889, filed on Jan. 3, 2019, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD. and 2) SEOUL NATIONAL UNIVERSITY R&DB FOUNDATION.

BACKGROUND

1. Field

The disclosure relates to a master device for managing distributed task processing, a task processing device for processing a task, and an operation method therefor.

2. Description of Related Art

Recently, research on edge computing technology has been actively conducted. Edge computing technology refers to a technology that enables a plurality of task processing devices, that is, edges, to perform a plurality of tasks instead of allowing a centralized server to perform the tasks. Compared to the existing centralized cloud computing, a processing rate is increased and security is increased due to data distribution. Accordingly, a distributed processing system based on edge computing has drawn much attention.

The distributed processing system may include a plurality of task processing devices. A task that needs to be processed may be performed by at least one of the plurality of task processing devices. For example, a device manufacturing factory system may control a device manufacturing process, and may also determine whether a manufactured device is a defective device or check the performance of the manufactured device. The device manufacturing factory system may include a plurality of task processing devices, which perform various tasks such as manufacturing a device, determining a defect, checking performance, or the like. Each of the plurality of task processing devices may receive and process various tasks produced. For example, a task processing device that is assigned with a task may obtain input information from an input device (e.g., a sensor or performance checking device) designated on the basis of the task, and may process the input information. The task processing device may output a processing result and may determine a defect or check performance, which is required from the processing, on the basis of the processing result. Tasks may be distributed by a master device.

The master device of the distributed processing system may determine a task processing device which is to process a task among the plurality of task processing devices. The master device may determine a task processing device which is to process a task such that a predetermined task processing device is prevented from processing an excessive amount of operations. If a predetermined task processing device is assigned with an excessive amount of operations, the processing rate of the corresponding task processing device may decrease and the processing rate of the overall task processing may decrease. Accordingly, research on a task distribution method which prevents a predetermined task processing device from processing an excessive amount of operations has been actively conducted.

A master device may determine a task processing device to which a new task is to be distributed on the basis of information associated with the number of tasks previously distributed to each of the plurality of task processing devices. The master device may set the maximum number of tasks that each of the plurality of task processing devices is capable of processing, and may not select a task processing device that currently processes the maximum number of tasks as a processing device to process the new task.

However, when the master device performs task on the basis of the number of tasks previously distributed, there is high probability that a task processing device having a large amount of idle resources is excluded, and the new task is distributed to a task processing device having a small amount of idle resources. For example, if a small number of tasks are distributed but a large amount of resources is to be consumed by the corresponding tasks, the new task may be distributed to a task processing device having a small amount of idle resources. The corresponding task processing device may have a high degree of resource competition among a plurality of tasks. Accordingly, the processing rate of the corresponding task processing device may decrease, and the processing rate of the overall system may decrease.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are provided to address at least the above-mentioned problems and/or disadvantages, and to provide at least the advantages described below. Accordingly, an aspect of the disclosure is to provide a master device and an operation method therefor which may obtain real-time resource information from task processing devices, and may determine a task processing device to which a task is to be distributed on the basis of the real-time resource information.

Another aspect of the disclosure is to provide a task processing device and an operation method therefor which may report real-time resource information to a master device.

Additional aspects will be set forth in part in the description which follows and, in part, will be apparent from the description, or may be learned by practice of the presented embodiments.

In accordance with an aspect of the disclosure, a master device for managing task processing of a plurality of task processing devices is provided. The master device includes a communication circuit, and at least one processor, wherein the at least one processor is configured to control the communication circuit to obtain first real-time resource information associated with resources that a first task processing device currently uses from the first task processing device among the plurality of task processing devices, control the communication circuit to obtain second real-time resource information associated with resources that a second task processing device currently uses from the second task processing device among the plurality of task processing devices, obtain information associated with processing of a task to be distributed to at least one of the plurality of task processing devices, obtain an amount of resources required for processing the task, the amount of resources required being identifiable by processing the task on the basis of the information associated with processing of the task, identify the first task processing device to be a task processing device to which the task is to be distributed among the first task processing device and the second task processing device on the basis of the first real-time resource information, the second real-time resource information, and the amount of resources required for processing the task, and control the communication circuit to transmit the information associated with processing of the task to the first task processing device.

In accordance with another aspect of the disclosure, a method for managing task processing of each of a plurality of task processing devices by a master device is provided. The method includes controlling a communication circuit of the master device to obtain first real-time resource information associated with resources that a first task processing device currently uses from the first task processing device among the plurality of task processing devices, controlling the communication circuit to obtain second real-time resource information associated with resources that a second task processing device currently uses from the second task processing device among the plurality of task processing devices, obtaining information associated with processing of a task that is to be distributed to at least one of the plurality of task processing devices, obtaining an amount of resources required for processing the task, the amount of resources required being identifiable by processing the task on the basis of the information associated with processing of the task, identifying the first task processing device to be a task processing device to which the task is to be distributed among the first task processing device and the second task processing device on the basis of the first real-time resource information, the second real-time resource information, and the amount of resources required for processing the task, and controlling the communication circuit to transmit the information associated with processing of the task to the first task processing device.

In accordance with another aspect of the disclosure, a master device for managing task processing of a plurality of task processing devices is provided. The master device includes a communication circuit, and at least one processor, wherein the at least one processor is configured to control the communication circuit to obtain first real-time resource information associated with resources that a first task processing device currently uses from the first task processing device among the plurality of task processing devices, control the communication circuit to obtain second real-time resource information associated with resources that a second task processing device currently uses from the second task processing device among the plurality of task processing devices, obtain information associated with processing of a task to be distributed to at least one of the plurality of task processing devices, identify the first task processing device to be a task processing device to which the task is to be distributed on the basis of an expected degree of competition for resources of the first task processing device when performing the distributed task being lower than an expected degree of competition for resources of the second task processing device when performing the task, using the first real-time resource information and the second real-time resource information, and control the communication circuit so as to transmit the information associated with processing of the task to the first task processing device.

According to embodiments of the disclosure, a master device and a method therefor may obtain real-time resource information from task processing devices, and may determine a task processing device to which a task is to be distributed on the basis of the real-time resource information. According to embodiments of the disclosure, a task processing device and a method therefor may report real-time resource information to a master device. Accordingly, task distribution is performed such that the degree of competition for resources of the overall system decreases, whereby the task processing rate of the system may be increased.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

Figure 1:
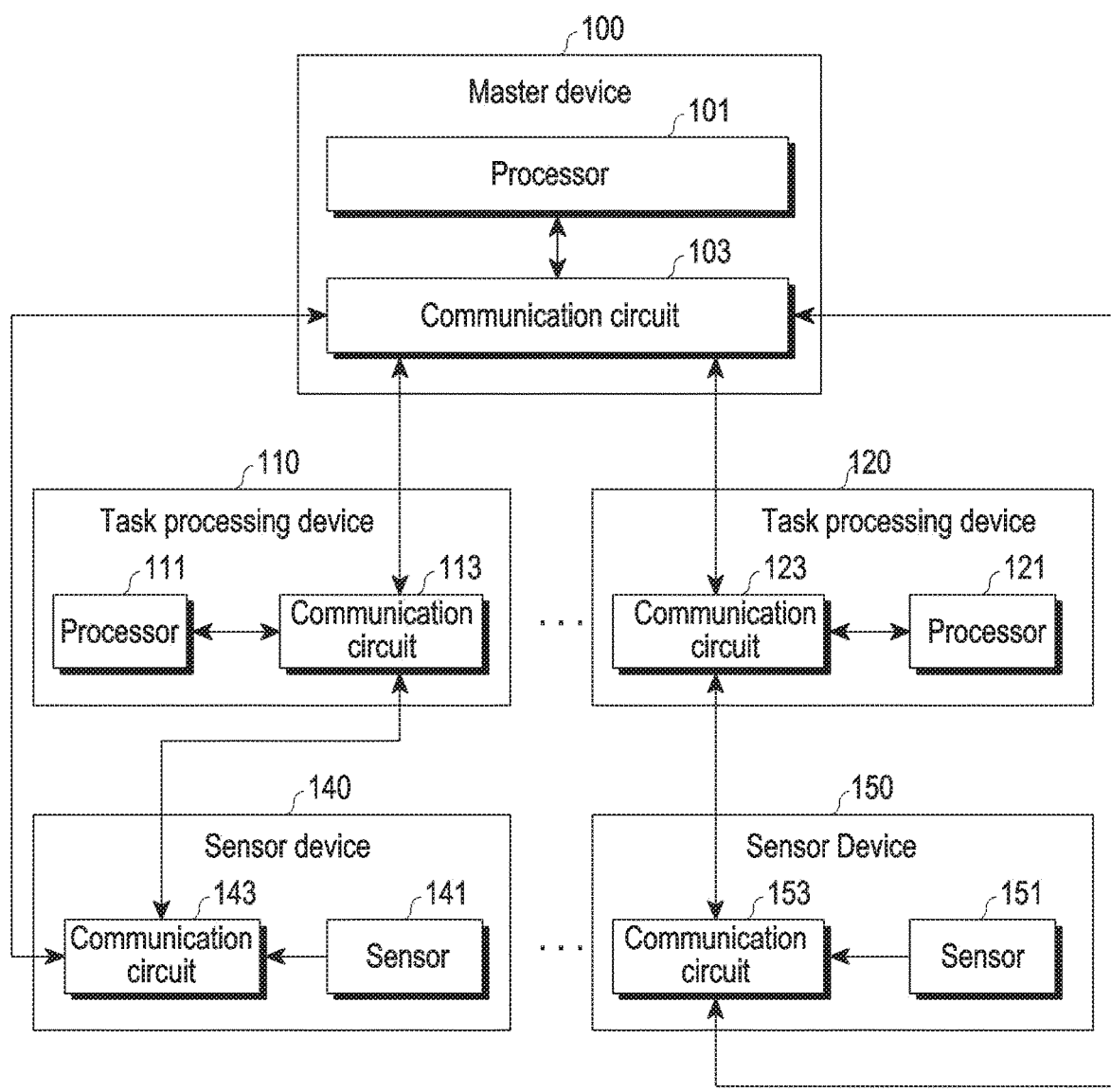
FIG. 1 is a block diagram illustrating a task processing system according to embodiments of the disclosure.

FIG. 1 illustrates a task processing system according to embodiments of the disclosure.

Referring to FIG. 1, a master device 100 may include a processor 101 and a communication circuit 103. A task processing device 110 may include a processor 111 and a communication circuit 113. A task processing device 120 may include a processor 121 and a communication circuit 123. A sensor device 140 may include a sensor 141 and a communication circuit 143. Another sensor device 150 may include a sensor 151 and a communication circuit 153. Although the number of task processing devices 110 and 120 and the number of sensor devices 140 and 150 illustrated in FIG. 1 are two for each, this is merely for ease of description. The number of task processing devices and the number of sensor devices are not limited to those shown.

The processor 101 may process the operation performed by the master device 100. In memory (not illustrated) included in the master device 100, instructions for performing operations may be stored. The processor 101 may execute instructions, and may perform various operations or may perform control so as to enable other pieces of hardware to perform operations. Throughout the present description, the fact that the master device 100 performs a predetermined operation may indicate that the processor 101 performs the predetermined operation, or the processor 101 may perform control such that an element included in the master device 100 or another device that is wiredly or wirelessly connected to the master device 100 performs the predetermined operation. Alternatively, the fact may indicate that an instruction for performing the predetermined operation is stored in memory (not illustrated) included in the master device 100.

The processor 101 may include at least one of one or more central processing units (CPUs) or one or more graphics processing units (GPUs). If the processor 101 includes a CPU and a GPU, the processor 101 may perform GPU-accelerated computing that allocates a computational intensive operation to the GPU, and processes the remaining code in the CPU. It can be said that the processor 101 performs a general purpose computing on graphics processing unit (GPGPU). Even though the processor 101 includes both the CPU and the GPU, the processor 101 may selectively use only the CPU to perform an operation, may selectively use only the GPU to perform an operation, or may selectively perform GPU-accelerated computing. The type of the above-described processor 101 is merely an example when the master device 100 is implemented as a general-purpose computer or a special-purpose computer. The form of implementation of the master device 100 is not limited to that shown. Accordingly, the type of the processor 101 is not limited if the processor 101 is capable of performing an operation (or an instruction) in order to determine task distribution to be described in detail below.

The communication circuit 103 may perform data transmission/reception with the task processing devices 110 and 120 or sensor devices 140 and 150. The communication circuit 103 may wiredly or wirelessly perform data transmission/reception with the task processing devices 110 and 120 or sensor devices 140 and 150. The communication circuit 103 may establish a direct (e.g., wired) communication channel or wireless communication channel between the master device 100 and an external electronic device (e.g., the task processing devices 110 and 120 or the sensor devices 140 and 150), and may support communication via the established communication channel.

The communication circuit 103 may include one or more communication processors which operate independently from the processor 101 and support direct (e.g., wired) communication or wireless communication. Alternatively, the communication circuit 103 may operate under the control of the processor 101. According to an embodiment of the disclosure, the communication circuit 103 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit or a power line communication circuit). A corresponding communication circuit among the communication circuits may communicate with an external electronic device via a first network (e.g., a short-range network such as Bluetooth, Wi-Fi direct, infrared data association (IrDA)) or a second network (e.g., a long-range communication network such as a cellular network, the Internet, or a computer network (e.g., LAN or WAN)). The various types of communication circuits may be integrated into a single element (e.g., a single chip) or may be implemented as a plurality of separate elements (e.g., a plurality of chips). The wireless communication circuit may use subscriber information (e.g., international mobile subscriber identification (IMSI)) stored in a subscriber identification module, so as to perform identification and authorization in a communication network such as the first network or the second network.

The communication circuit 103 may receive data directly from the processor 101, and may wiredly transfer the same to an external electronic device (e.g., task processing devices 110 and 120). In this instance, the communication circuit 103 may be implemented as an input/output interface. If the communication circuit 103 is implemented as an input/output interface, the processor 101 may receive data from an external electronic device (e.g., the task processing devices 110 and 120 or the sensor devices 140 and 150) via the input/output interface. According to various embodiments of the disclosure, the master device 100 may wiredly or wirelessly perform data transmission/reception with all of the task processing devices 110 and 120. Alternatively, the master device 100 may wiredly perform data transmission/reception with some of the task processing devices 110 and 120, and may wirelessly perform data transmission/reception with the remaining devices. According to various embodiments of the disclosure, the master device 100 may wiredly or wirelessly perform data transmission/reception with all of the sensor devices 140 and 150. Alternatively, the master device 100 may wiredly perform data transmission/reception with some of the sensor devices 140 and 150, and may wirelessly perform data transmission/reception with the remaining devices. The processor 101 and the communication circuit 103 may be connected to each other via a scheme of communication between neighboring devices (e.g., a bus, a general purpose input/output (GPIO), a serial peripheral interface (SPI), or a mobile industry processor interface (MIPI)), and may mutually exchange signals (e.g., commands or data). In the document, "communication circuit" may refer to a radio frequency (RF) circuit and an antenna for wireless communication, or may refer to an input/output interface for wired communication.

The processor 111 of the task processing device 110 may include at least one of one or more CPUs or one or more GPUs. The processor 121 of the task processing device 120 may include at least one of one or more CPUs or one or more GPUs. The processor 111 of the task processing device 110 may be implemented to be the same as, or different from, that of the processor 121 of the task processing device 120. For example, the processor 111 of the task processing device 110 may be implemented to include one or more CPUs, and the processor 121 of the task processing device 120 may be implemented to include one or more CPUs and one or more GPUs. Alternatively, although the processor 111 of the task processing device 110 and the processor 121 of the task processing device 120 are implemented to be in the same form, the processor 111 and the processor 121 may have difference in performance. The communication circuit 113 of the task processing device 110 and the communication circuit 123 of the task processing device 120 may be implemented according to a communication scheme of the communication circuit 103 of the master device 100. At least one of the communication circuit 113 or the communication circuit 123 may transfer a task performance result to an external electronic device. The communication circuit 113 or the communication circuit 123 may output a task performance result to the master device 100, or to an output port.

The communication circuit 143 of the sensor device 140 and the communication circuit 153 of the sensor device 150 may be implemented according to a communication scheme of the communication circuit 103 of the master device 100. The sensor 141 of the sensor device 140 may sense input data associated with a task, and the sensor 151 of the sensor device 150 may sense input data associated with a task. At least one of the sensor 141 or the sensor 151 may be implemented as, for example, a camera capable of photographing a device manufactured in a factory. At least one of the sensor 141 or the sensor 151 may be a device capable of measuring various performances of a manufactured device. The type of sensing data and the type of sensor is not limited to those shown.

According to various embodiments of the disclosure, the master device 100 and the task processing devices 110 and 120 may configure an edge computing system. Accordingly, the master device 100 may be referred to as a master edge, or the task processing devices 110 and 120 may be referred to as edges.

Figure 2A:
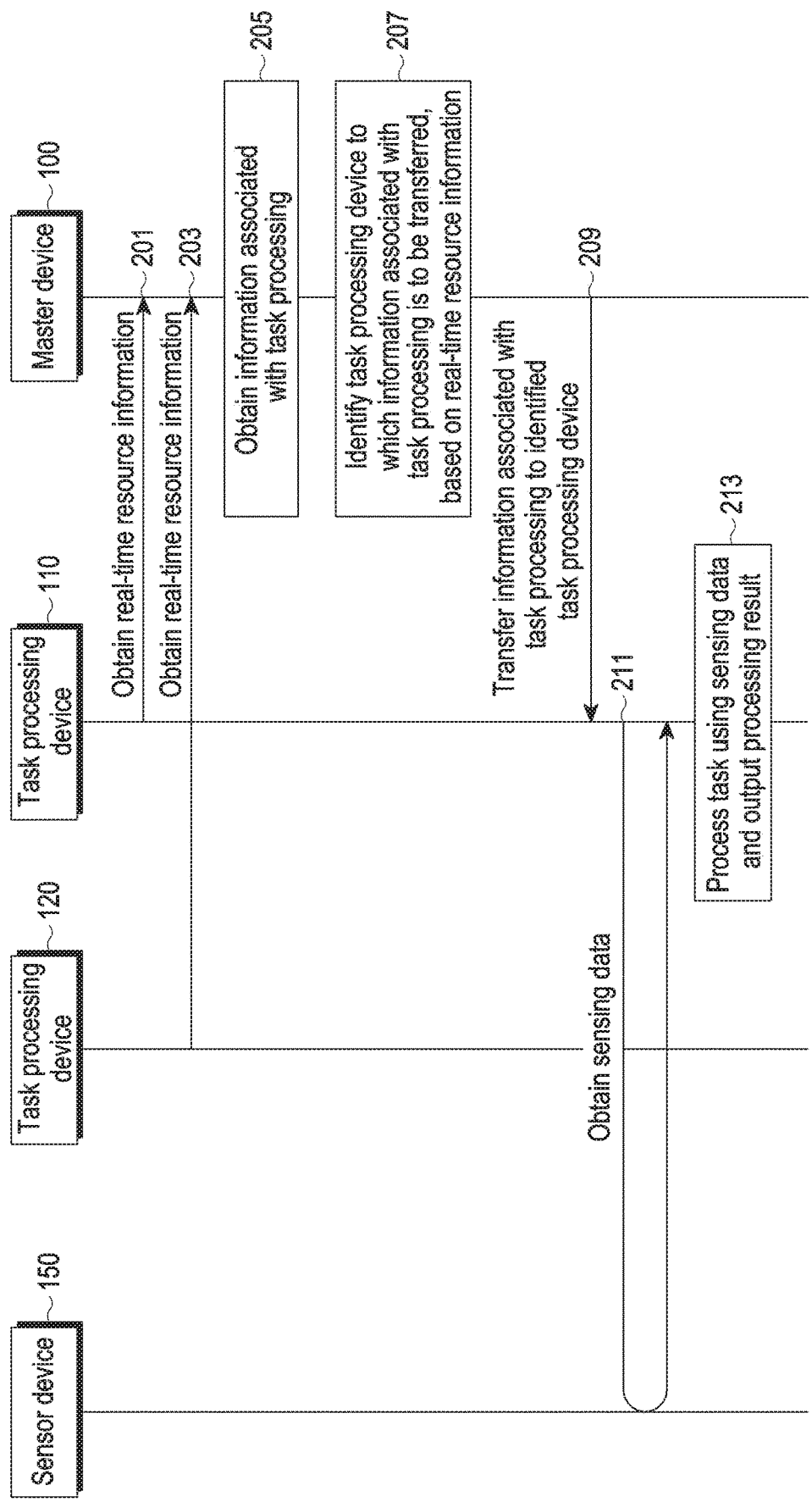
FIG. 2A is a flowchart illustrating operations of a master device, a task processing device, and a sensor device according to various embodiments of the disclosure.

FIG. 2A is a flowchart illustrating operations of a master device, a task processing device, and a sensor device according to embodiments of the disclosure.

Referring to FIG. 2A, the master device 100 may obtain real-time resource information from the task processing device 110 in operation 201. The real-time resource information may include information associated with the amount of resources that the task processing device 110 currently uses. For example, the real-time resource information of the task processing device 110 may include at least one of a main memory bandwidth or a last level cache (LLC) hit ratio which is data related to resources of a CPU. The LLC hit ratio is a data reuse rate in an LLC that one or more CPUs of the task processing device 110 share. The main memory bandwidth may be a bandwidth at which the LLC shared by one or more CPUs requests to a memory per second. The LLC hit ratio and the main memory bandwidth are merely examples. Those skilled in the art may easily understand that any information is available, if the information shows the amount of resources that the task processing device 110 uses in real time, such as a CPU usage rate or the like. As another example, the real-time resource information of the task processing device 110 may include at least one of a GPU occupancy (GO) or a GPU memory bandwidth, which is data related to resources of the GPU. The GO may be a value obtained by dividing the number of GPU thread groups currently used by the maximum number of GPU thread groups usable in the task processing device 110. The GPU memory bandwidth may indicate a bandwidth at which all thread groups in a GPU request to a memory per second. The GO and the GPU memory bandwidth are merely examples. Those skilled in the art may easily understand that any information is available if the information shows the amount of resources that the task processing device 110 uses in real time, such as a GPU usage rate or the like. In operation 203, the master device 100 may obtain real-time resource information from the task processing device 120. If a task processing device includes only a CPU, only information associated with the amount of use of the CPU in real time may be transferred to the master device 100. If a task processing device includes a CPU and a GPU, information associated with the amount of use of the CPU in real time and information associated with the amount of use of the GPU in real time may be transferred to the master device 100.

The task processing devices 110 and 120 may periodically report real-time resource information to the master device 100, or, if a designated event is detected, may aperiodically report resource information to the master device 100. Alternatively, the master device 100 may request real-time resource information from task processing devices 110 and 120 at the point in time at which task distribution is requested, and the task processing devices 110 and 120 may transmit real-time resource information to the master device 100 in response to the request.

In operation 205, the master device may obtain information associated with task processing. The information associated with task processing may be expressed as, for example, a task descriptor. The task descriptor may be information required for performing a task and may include various types of information, such as information associated with input data, information associated with a source from which input data is to be obtained, information associated with a task processing algorithm, information associated with an address to which a processing result is to be output, and the like. The task descriptor will be described in detail below. In the distributed processing system, a plurality of tasks needs to be performed. Accordingly, information associated with processing a plurality of tasks, which respectively correspond to the plurality of tasks, may be obtained by the master device 100.

In operation 207, the master device 100 may identify a task processing device to which the information associated with task processing is to be transmitted on the basis of the real-time resource information. The task processing device that obtains the information associated with task processing processes a task using the information associated with task processing. Accordingly, it can be said that the master device 100 identifies a task processing device to which a task is to be distributed. The master device 100 may store a check condition in association with real-time resource information, for example, at least one of an LLC hit ratio, a main memory bandwidth, a GO, or a GPU memory bandwidth. The master device 100 may apply the real-time resource information obtained from task processing devices to the check condition, and may select any one of the task processing devices on the basis of the result of application. For example, the master device 100 may identify a task processing device which has used the lowest amount of resources among the task processing devices to be a task processing device to which the information associated with task processing is to be transferred. As another example, the master device 100 may compare at least one of the LLC hit ratio, the main memory bandwidth, the GO, or the GPU memory bandwidth of each of the task processing device with one another, and may identify a task processing device which has used the lowest amount of resources on the basis of the comparison result. The master device 100 may further use another parameter (e.g., a CPU usage rate or the like) in addition to the above-described parameters, or may use another parameter so as to identify a task processing device. The master device 100 may identify a task processing device which secures the largest amount of idle resources among the task processing devices to be a task processing device to which information associated with task processing is to be transferred. The master device 100 may identify the degree of resource competition of each of the task processing devices on the basis of the real-time resource information, and may determine a task processing device which is identified to have the lowest degree of resource competition to be a task processing device to which the information associated with task processing is to be transmitted. According to another embodiment of the disclosure, the master device 100 may further identify information required for processing a task on the basis of the information associated with task processing, and may use the same together with the real-time resource information so as to determine a task processing device to which the information associated with task processing is to be transmitted, which will be described in detail below.

In operation 209, the master device 100 may transfer the information associated with task processing to the identified task processing device. For example, it is assumed that the master device 100 identifies the task processing device 110. The task processing device 110 may produce the task on the basis of the obtained information associated with task processing. The task may be expressed as a term such as a work load or the like. In operation 211, the task processing device 110 may obtain sensing data from the sensor device 150 on the basis of the task. For example, the information associated with task processing may include information associated with a source of input data (e.g., identification information of the sensor device 150 or address information of the sensor device 150), and the task processing device 110 may obtain sensing data from the sensor device 150 using the information associated with the source of input data. In operation 213, the task processing device 110 may process the task using the sensing data and may output the processing result.

As described above, the master device 100 may distribute a new task on the basis of real-time resource information of the task processing devices 110 and 120 such that a predetermined task processing device does not process an excessive amount of operations, and the degree of resource competition of the predetermined task processing device may not excessively increase.

Figure 2B:
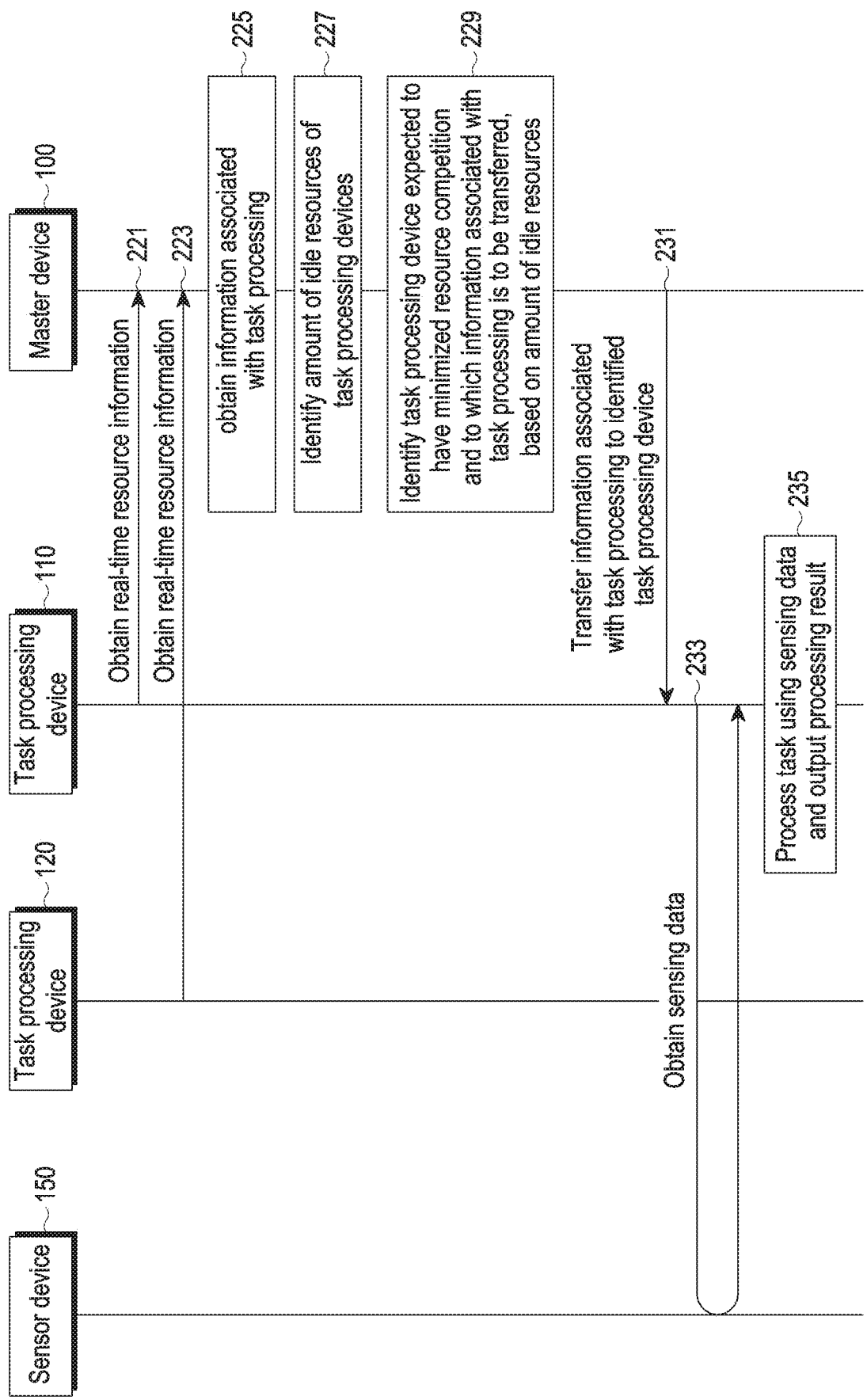
FIG. 2B is another flowchart illustrating operations of a master device, a task processing device, and a sensor device according to embodiments of the disclosure.
Figure 2C:
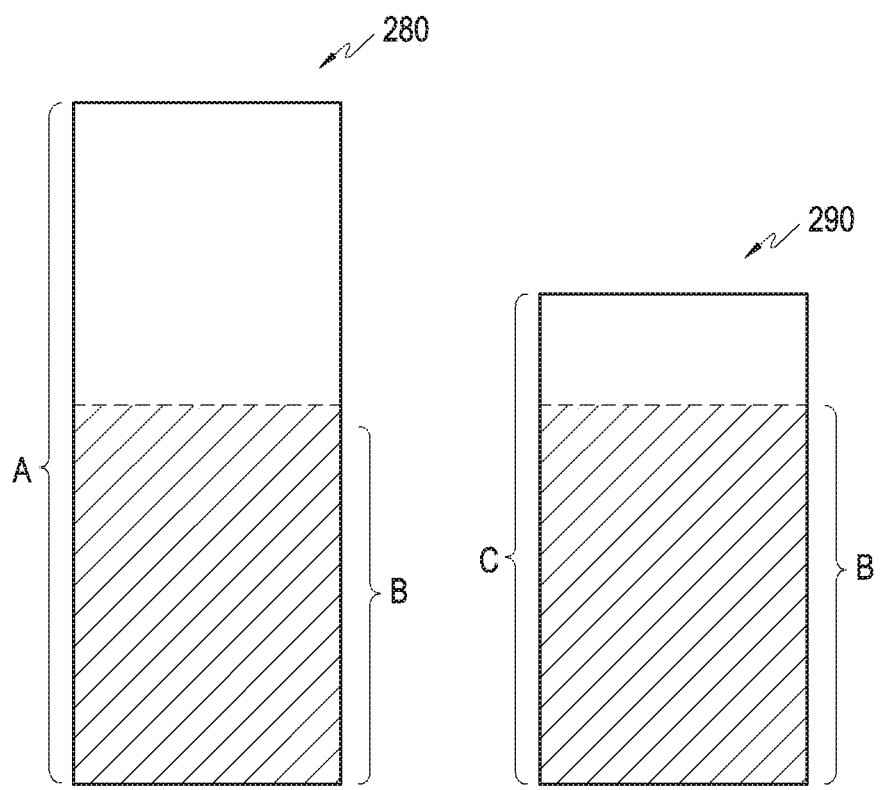
FIG. 2C is a diagram illustrating an example of a use of resources for each task processing device according to embodiments of the disclosure.

FIG. 2B is another flowchart illustrating operations of a master device, a task processing device, and a sensor device according to embodiments of the disclosure. The embodiment of FIG. 2B will be described in more detail with reference to FIG. 2C. FIG. 2C is a diagram illustrating an example of a use of resources for each task processing device according to embodiments of the disclosure. The operations of FIG. 2B, which have been described in the descriptions of operations of FIG. 2A, will be described only briefly.

Referring to FIG. 2B, the master device 100 may obtain real-time resource information from the task processing device 110 in operation 221, and may obtain real-time resource information from the task processing device 120 in operation 223. In operation 225, the master device 100 may obtain information associated with task processing.

In operation 227, the master device 100 may identify the amount of idle resources of the task processing devices 110 and 120. For example, the master device 100 may identify the amount of idle resources of each of the task processing devices 110 and 120 on the basis of the received real-time resource information. In operation 229, the master device 100 may identify a task processing device which is expected to have minimized resource competition and to which the information associated with task processing is to be transmitted on the basis of the amount of idle resources. As another example, the master device 100 may identify a task processing device having the largest amount of idle resources among the task processing devices 110 and 120 to be a task processing device to which the information associated with task processing is to be transferred. As another example, the master device 100 may manage the information associated with the amount of idle resources of each of the task processing devices 110 and 120. For example, referring to FIG. 2C, resource information 280 of the task processing device 110 may include a maximum amount of resources usable (A) and an amount of resources used in real time (B), and resource information 290 of the task processing device 120 may include a maximum amount of resources usable (C) and an amount of resources used in real-time (B). The information associated with idle resources may be directly identified from a parameter (e.g., at least one of an LLC hit ratio, a main memory bandwidth, a GO, or a GPU memory bandwidth) obtained from the task processing devices 110 and 120, or may be identified by operating an obtained parameter. The resource information 280 and 290 of FIG. 2C are illustrated in order to merely describe the concept of the amount of idle resources. The master device 100 may manage various parameters related to the amount of idle resources, and the amount of idle resources is illustrated for ease of description. The master device 110 may directly identify a task processing device using a parameter obtained from the task processing devices 110 and 120. For example, the GO is related to a ratio of a currently used GPU to the entire GPU. The master device 100 may identify a task processing device having the lowest GO to be a task processing device to which a task is to be distributed. The unit "A", "B", "C", or the like in FIG. 2C may be one of an LLC hit ratio, a main memory bandwidth, a GO, or a GPU memory bandwidth, or may be obtained on the basis of at least one of an LLC hit ratio, a main memory bandwidth, a GO, or a GPU memory bandwidth.

The master device 100 may identify the task processing device 110 having the amount of idle resources larger than those of the other task processing devices to be the task processing device to which the information associated with task processing is transferred. Although the task processing device 110 and the task processing device 120 use the same amount of resources, the master device 100 may select the task processing device 110 that has a larger amount of idle resources. The fact that the amount of idle resources is high may indicate that the degree of resource competition is low when a new task is distributed. Accordingly, the master device 100 may preferentially distribute a task to a task processing device which has a larger amount of idle resources than the others. In operation 231, the master device 100 may transfer the information associated with task processing to the identified task processing device, in operation 233, the task processing device 110 may obtain sensing data from the sensor device 150 on the basis of the task, and in operation 235, the task processing device 110 may process the task using the sensing data and may output the processing result.

According to another embodiment of the disclosure, the master device 100 may identify the amount of resources required for task processing via profiling, and may additionally use the same to identify a task processing device to which the information associated with task processing is to be transmitted, which will be described in detail below.

Figure 3:
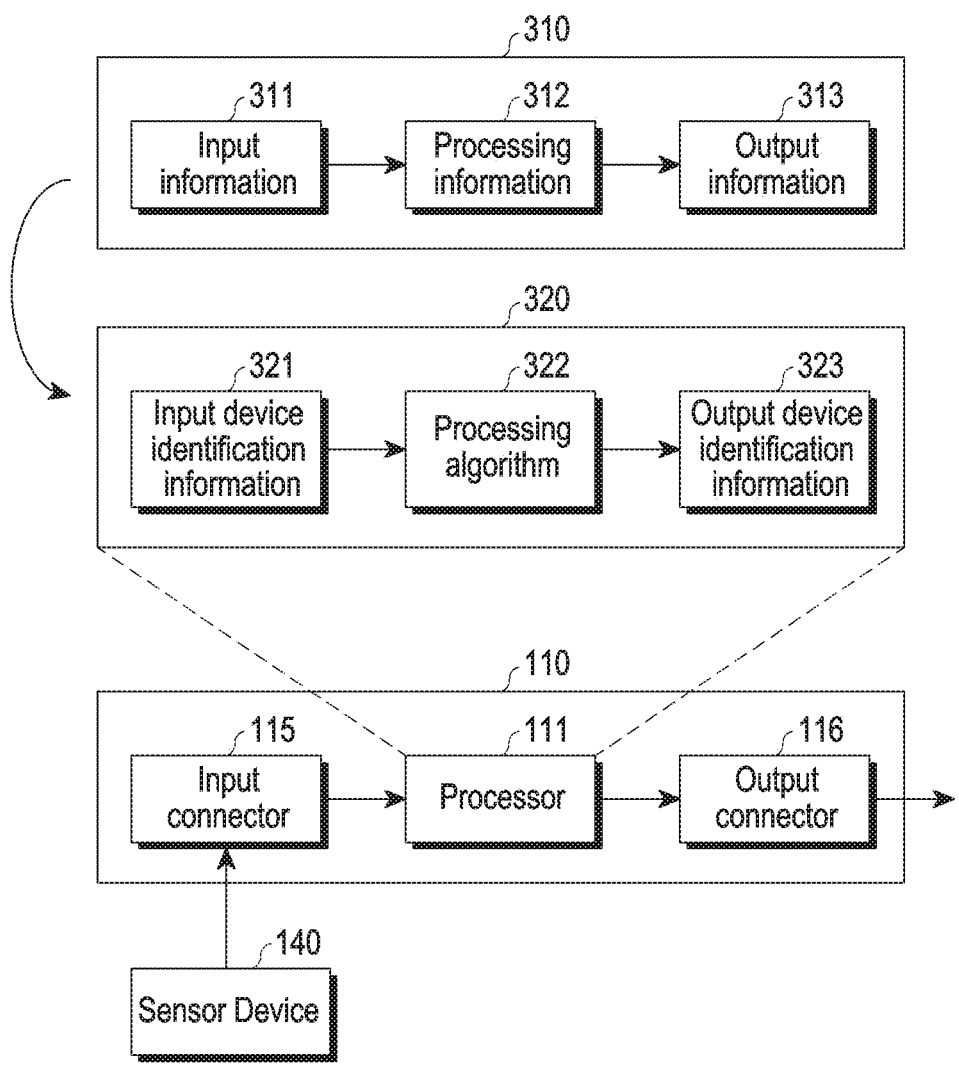
FIG. 3 is a block diagram illustrating task processing according to embodiments of the disclosure.

FIG. 3 is a block diagram illustrating task processing according to embodiments of the disclosure.

Referring to FIG. 3, the task processing device 110 may obtain a task descriptor 310, which is an example of information associated with task processing, from the master device 110. The task descriptor 310 may include input information 311, processing information 312, and output information 313. The input information 311 may include at least one of information associated with input data or identification information on input device. The processing information 312 may include an algorithm for processing input data. The output information 313 may include output device identification information 323. For example, the task descriptor 310 may be implemented as code including an input command associated with input using the input information 311, a processing algorithm command, and an output command associated with output using the output information 313.

The task processing device 110 may produce a task 320 on the basis of the task descriptor 310. The processor 111 may process the task 320. The processor 111 may implement codes included in the task 320. For example, the processor 111 may implement a first code including input device identification information 321. As the first code is executed, the processor 111 may obtain sensing data from the sensor device 140 via an input connector 115. For example, if the task processing device 110 is wiredly connected to the sensor device 140, the processor 111 may obtain sensing data via the input connector 115. If the task processing device 110 wirelessly communicates with the sensor device 140, the processor 111 may obtain sensing data via the communication circuit 113. The processor 111 may execute a second code including a processing algorithm 322 for processing input data. The processor 111 may execute a third code including the output device identification information 323. The processor 111 may transfer the processing result, which is obtained as the processing algorithm operates, to an external port via an output connector 116. As another example, if the task processing device 110 is wiredly connected to the external port, the processor 111 may transfer the processing result via the output connector 116. If the task processing device 110 wirelessly communicates with the external port, the processor 111 may transfer the processing result via the communication circuit 113.

Figure 4:
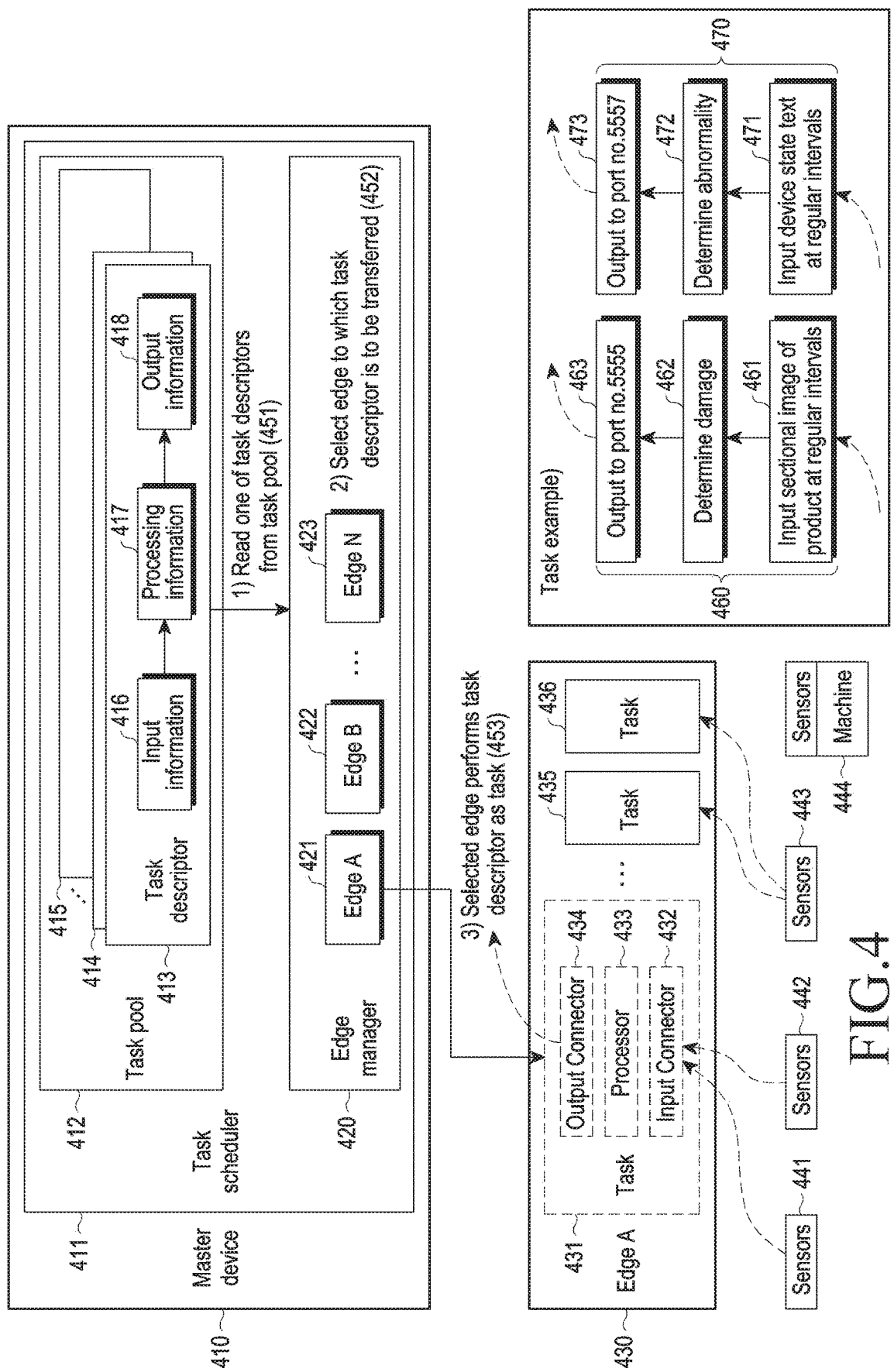
FIG. 4 is a block diagram illustrating a master device, a task processing device, and a sensor device according to embodiments of the disclosure.

FIG. 4 is a block diagram illustrating a master device, a task processing device, and a sensor device according to embodiments of the disclosure.

Referring to FIG. 4, a master device 410 (e.g., the master device 100) may include a task scheduler 411, and the task scheduler 411 may include a task pool 412 and an edge manager 420. The task scheduler 411 may include a plurality of task descriptors 413, 414, and 415, and the task descriptor 413 may include input information 416, processing information 417, and output information 418 as described above. The edge manager 420 may read a single task descriptor from the task pool 412 in operation 451. The edge manager 420 may select an edge, that is, a task processing device to which the read task descriptor is to be transferred in operation 452. As described above, the edge manager 420 may manage information associated with connected edges 421, 422, and 423. The edge manager 420 may obtain real-time resource information from each of the edges. The edge manager 420 may select an edge to which the read task descriptor is to be transferred on the basis of the real-time resource information in operation 453. For example, the edge manager 420 may select edge A 430 to be an edge to which the task descriptor is to be transferred. The edge A 430 may be processing tasks 435 and 436 which have been produced. The edge A 430 may transfer real-time resource information obtained by processing the tasks 435 and 436 which have been produced to the master device 410.

The edge A 430 may produce a task 431 on the basis of the obtained task descriptor, and may process the task 431. As described in FIG. 3, the edge A 430 may obtain sensing data from sensor devices 441 and 442 via an input connector 432. In addition, the edge A 430 may obtain sensing data from sensor devices 443 and 444 in order to process the tasks 435 and 436 using processor 433. The edge A 430 may process the tasks 431, 435, and 436 and may transfer the processing result to an external port via an output connector 434.

The edge A 430 may also process, for example, a first task 460. The first task 460 may include a code 461 for receiving input of a sectional image of a product at regular intervals, a damage determination code 462, and a code 463 for performing output to port number 5555. According to various embodiments of the disclosure, an edge A 430 may obtain a left/right/top/bottom/front/back image of a product from a sensor device. The edge A 430 may obtain an image photographed by changing the location of lighting. The number of images obtained by photographing a single product, the sizes of the images, and a production scheme may be different according to a process. The damage determination code 462 may include at least one code for identifying whether damage is included within a product via analysis of various images.

A second task 470 may include a code 471 for receiving input of text associated with a device state at regular intervals, an abnormal state determination code 472, and a code 473 for performing output to port number 5557. Text may be, for example, log data. The log data is, for example, log data associated with a manufacturing device as opposed to a manufactured product, and may include a time spent on cutting by a cutting machine, which is a manufacturing device, the temperature of the cutting machine, the rotation speed of the cutting machine, the temperature of the substrate of an inspection device, alarm information from the inspection device, and the like. An interval at which information is produced is different for each type of information, for example, 100 ms, 1 s, 2 s, and 5 s. The abnormal state determination code 472 may include a code for analyzing the degree of aging of the cutting machine, estimating a time for changing the cutting machine (i.e., cutting tool, oil, coolant, and so forth), predicting a defect in advance, and detecting a failure and giving warning by utilizing, for example, an average movement of the manufacturing device or the like.

Figure 5:
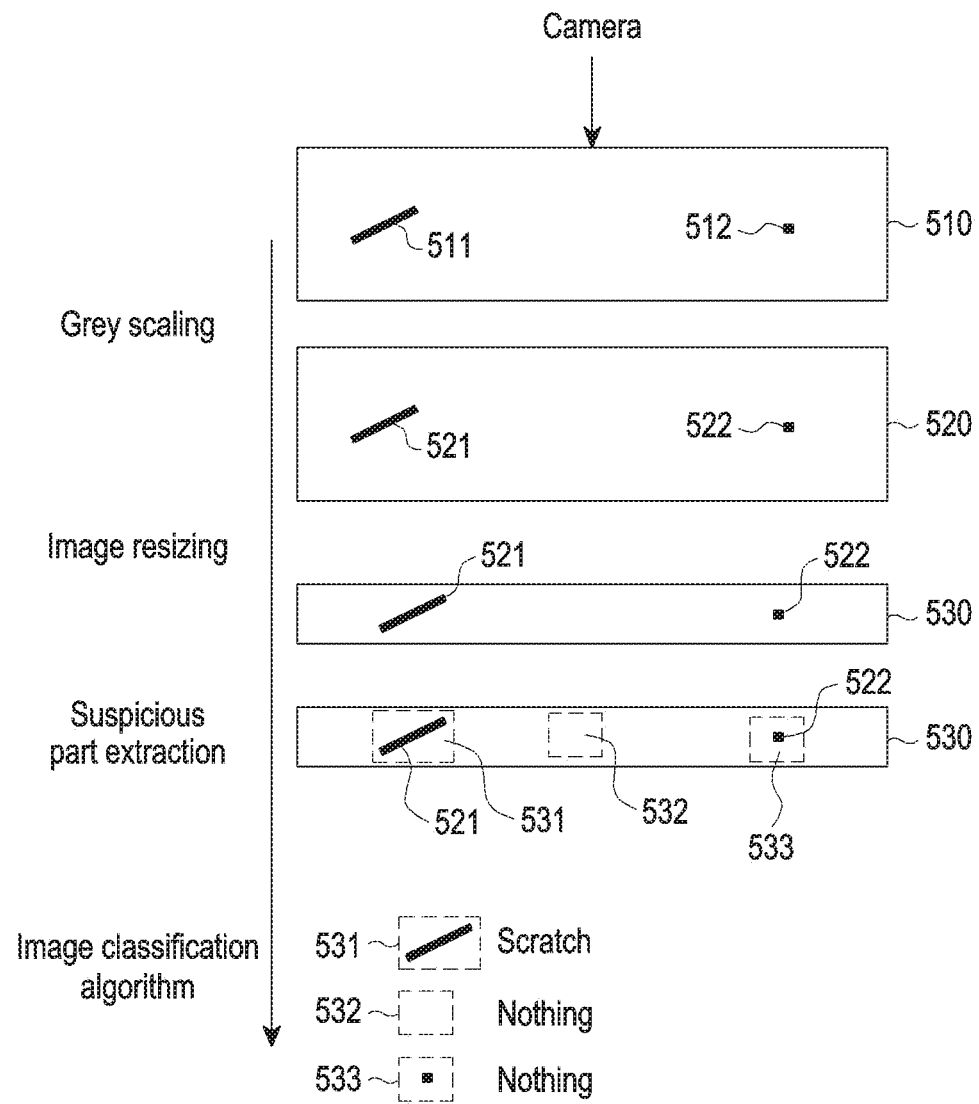
FIG. 5 is a diagram illustrating a task processing algorithm according to embodiments of the disclosure.

FIG. 5 is a diagram illustrating a task processing algorithm according to embodiments of the disclosure.

Referring to FIG. 5, a task processing device (e.g., the task processing device 110) according to embodiments may obtain a task descriptor from the master device 100. The task descriptor may describe a task for determining whether a manufactured product is defective. The task processing device may process a task on the basis of the task descriptor. The task processing device may obtain an image from a camera corresponding to input device identification information (or address information) of the task descriptor. The task may include a code for obtaining an image from identification information (or address information) of the camera, and the task processing device may obtain an image 510 as a code is executed. The camera may obtain the image 510 by photographing one side of a manufactured product, and may transfer the same to the task processing device. In an example, one side of the manufacturing product may be scratched during a manufacturing process. The image 510 may include objects 511 and 512 corresponding to possible scratches on one side of the manufactured product.

The task may include at least one code corresponding to a processing algorithm for processing input data of the image 510 and outputting output data associated with a defect. As the at least one code is executed, the task processing device may perform grey scaling (e.g., scaling from RGB to Grey) with respect to the obtained image 510. Accordingly, a grey-scaled image 520 may be obtained. The grey-scaled image 520 may include objects 521 and 522 corresponding to possible scratches. As the at least one code is executed, the task processing device may resize the grey-scaled image 520 (e.g., resizing from 4000×500 to 2000×250). Accordingly, a resized image 530 may be obtained. The resized image 530 may include the objects 521 and 522 corresponding to possible scratches. As the at least one code is executed, the task processing device may extract suspicious parts 531, 532, and 533 from the resized image 530. According to various embodiments, the task processing device may extract the suspicious parts 531, 532, and 533 corresponding to a predetermined scope, or may extract the suspicious parts 531, 532, and 533 on the basis of the result of analyzing the resized image 530. As the at least one code is executed, the task processing device may apply an image classification algorithm to a suspicious part. The image classification algorithm may output information associated with whether a scratch is included in an input image, as output data. The image classification algorithm may be an algorithm for identifying whether the objects 521 and 522 included in the input data are scratches. The image classification algorithm may be obtained on the basis of applying various learning algorithms such as machine learning, deep-learning, or the like, to a database including various images of scratches which may affect the capability of a product. The image classification algorithm may be updated. For example, if the library version of the algorithm is changed, if a parameter value is corrected, if the neural network structure of the learning algorithm is changed, or if the database to which the learning algorithm is applied is changed, the image classification algorithm may also be updated. In this instance, the task descriptor may also be updated. Alternatively, the task may include an object recognition algorithm, an abnormality detection algorithm, or the like, and the recognition/detection algorithms may also be obtained on the basis of various learning algorithms. The task processing device may identify that, for example, the object 521 is a scratch. Accordingly, the task processing device may output the processing result indicating that the corresponding manufactured product is defective. For example, the task processing device may identify various task processing results indicating whether an element of the product is defective, whether components are assembled, and the like.

Figure 6:
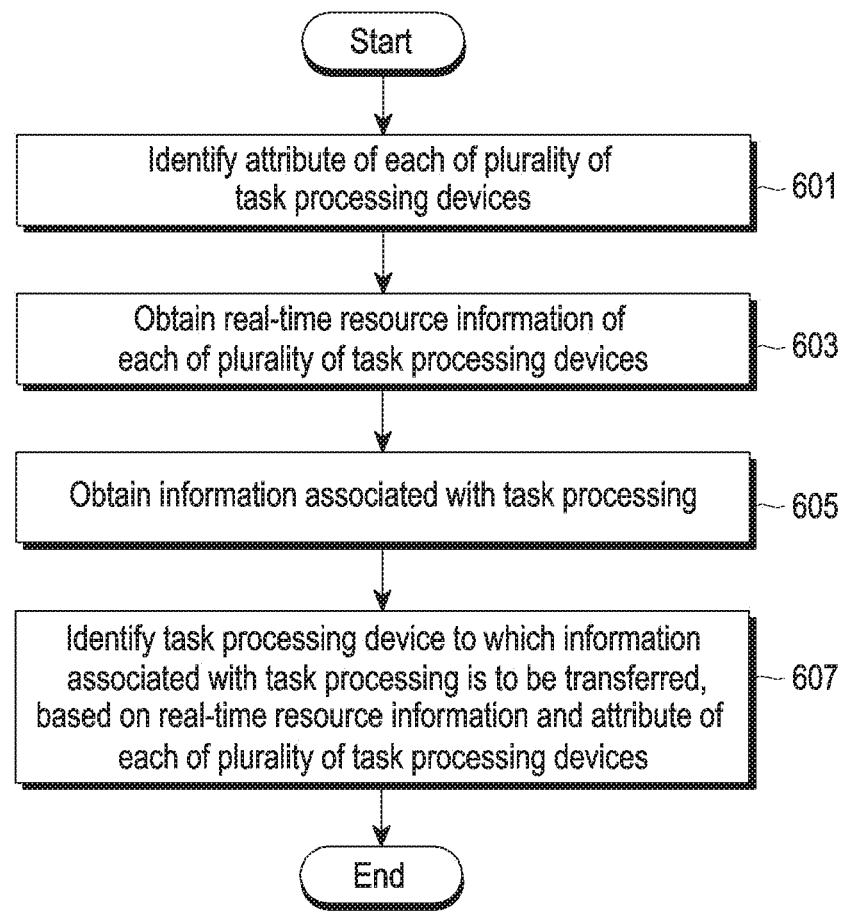
FIG. 6 is a flowchart illustrating an operation method of a master device according to embodiments of the disclosure.

FIG. 6 is a flowchart illustrating an operation method of a master device according to embodiments of the disclosure.

Referring to FIG. 6, the master device 100 may identify the attribute of each of a plurality of task processing devices in operation 601. The attribute of each of the plurality of task processing devices may indicate the type of processor of each of the plurality of task processing devices. For example, the attribute of a task processing device may indicate that a processor is implemented to include only a CPU, or the processor is implemented to include a CPU and a GPU.

In operation 603, the master device 100 may obtain real-time resource information from each of the plurality of task processing devices. As described above, the master device 100 may obtain real-time resource information from each of the plurality of task processing devices, periodically or aperiodically. First group task processing devices among the plurality of task processing devices may include only CPUs, and second task processing devices may include CPUs and GPUs. The master device 100 may obtain at least one of a main memory bandwidth or an LLC hit ratio which is associated with resources of a CPU from a first group task processing device. The master device 100 may receive at least one of a main memory bandwidth or an LLC hit ratio which is associated with resources of a CPU, and at least one of a GPU memory bandwidth or a GO which is associated with resources of a GPU, from a second group task processing device.

In operation 605, the master device 100 may obtain information associated with task processing. In operation 607, the master device 100 may identify a task processing device to which the information associated with task processing is to be transmitted on the basis of the real-time resource information and the attribute of each of the plurality of task processing devices. For example, the master device 100 may preferentially distribute a task to a task processing device including both a CPU and GPU. The master device 100 may distribute the task to a task processing device having the lowest degree of resource competition among task processing devices including both CPUs and GPUs. If the task processing devices including both CPUs and GPUs have a high degree of resource competition, or have a small amount of idle resources, the master device 100 may distribute the task to a task processing device including only a CPU.

Figure 7:
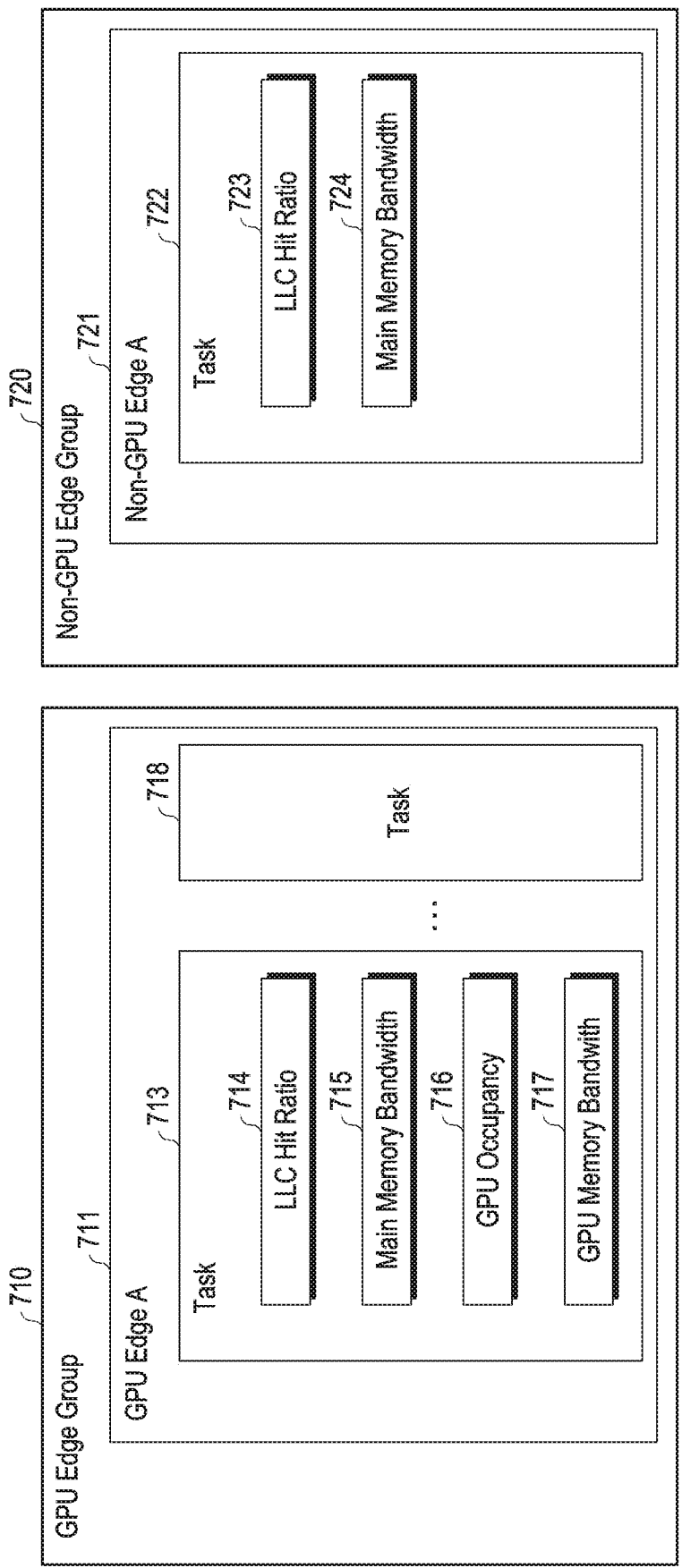
FIG. 7 is a block diagram illustrating an edge management method according to embodiments of the disclosure.

FIG. 7 is a diagram illustrating an edge management method according to embodiments of the disclosure.

Referring to FIG. 7, the master device 100 may manage task processing devices by dividing them into a GPU edge group 710 that supports a GPU and a Non-GPU edge group 720 that does not support a GPU. As described above, the master device 100 may identify the attribute of each task processing device, and may divide the task processing devices into both groups on the basis of the identified attribute. For example, the master device 100 may manage GPU edge A 711 as a GPU edge group 710 on the basis of attribute information indicating that the GPU edge A 711 supports a GPU. The master device 100 may manage Non-GPU edge A 721 as a Non-GPU edge group 720 on the basis of attribute information indicating that the Non-GPU edge A 721 does not support a GPU. The master device 100 may obtain and manage real-time resource information of the GPU edge A 711, and may obtain and manage real-time resource information of the Non-GPU edge A 721. For example, the master device 100 may obtain and manage real-time resource information of the entirety of the GPU edge A 711, and may obtain and manage real-time resource information of the entirety of the Non-GPU edge A 721.

Alternatively, the master device 100 may manage an LLC hit ratio 714, a main memory bandwidth 715, a GO 716, and a GPU memory bandwidth 717 of a task 713 that is being processed in the GPU edge A 711. The task processing device may transfer the real-time resource information of the entire edge to the master device 100, or may transfer, to the master device 100, real-time resource information for each task that is being processed in the edge. The master device 100 may manage real-time resource information of another task 718 that is being processed in the GPU edge A 711. The master device 100 may manage an LLC hit ratio 723 and a main memory bandwidth 724 of a task 722 that is being processed in the Non-GPU edge A 721.

The master device 100 may distribute tasks on the basis of the attributes of edges. According to various embodiments of the disclosure, the master device 100 may identify whether a task to be distributed is associated with a GPU or a CPU, and may distribute a task on the basis of the result of the identification and the attributes of each edge, which will be described in detail below.

Figure 8A:
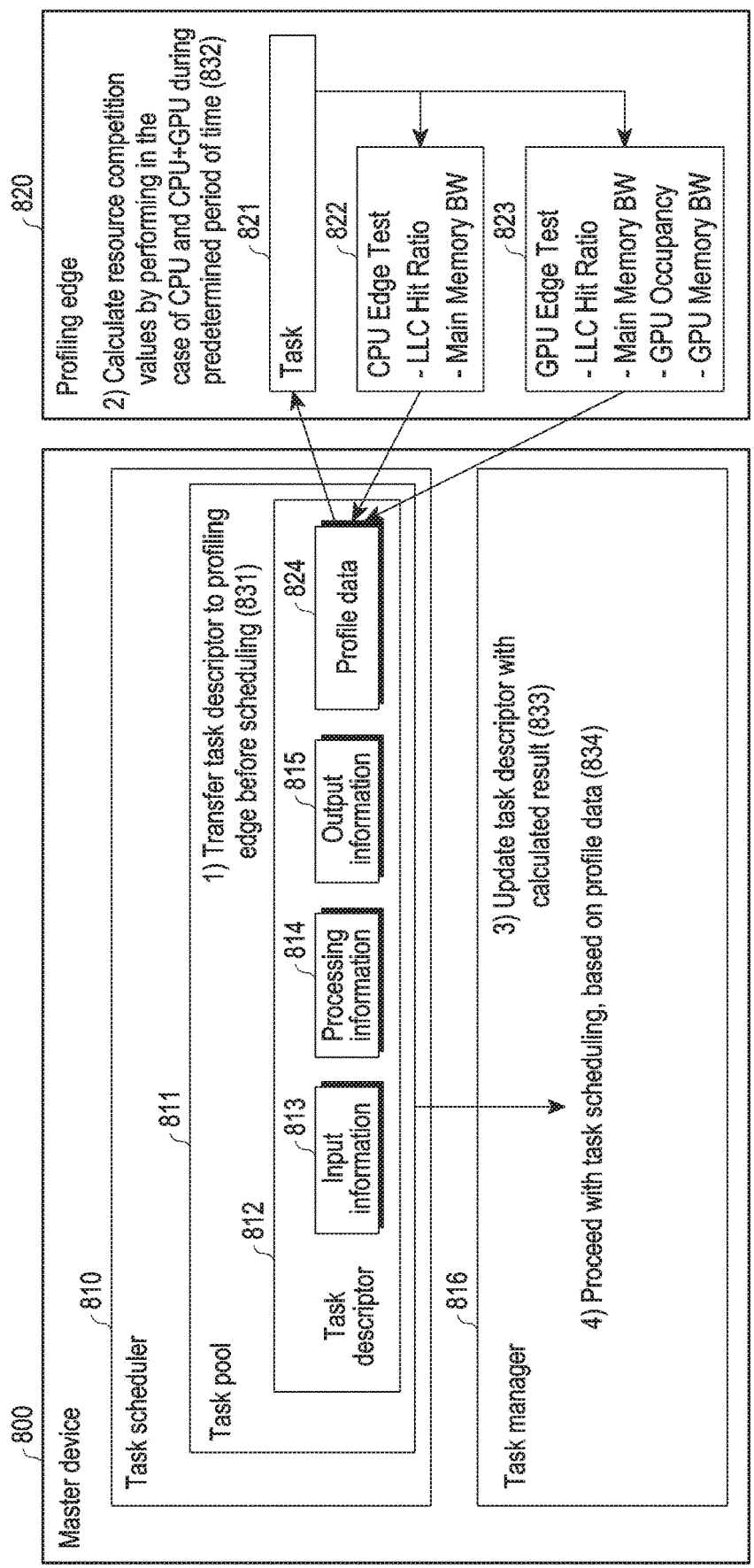
FIG. 8A is a block diagram illustrating task distribution based on a profiling result according to embodiments of the disclosure.

FIG. 8A is a diagram illustrating task distribution based on a profiling result according to embodiments of the disclosure. The elements which have been described with reference to FIG. 4 will be described only briefly.

Referring to FIG. 8A, a master device 800 (e.g., the master device 100) may include a task scheduler 810 and a task manager 816. A task descriptor 812 may be stored in a task pool 811 of the task scheduler 810. The task descriptor 812 may include input information 813, processing information 814, and output information 815 associated with a task.

The master device 800 according to various embodiments of the disclosure may process a task 821 corresponding to the task descriptor 812, and then may identify information required for task processing. The master device 800 may perform task distribution on the basis of the task processing result, and the process of processing a task and identifying information required for processing the task is referred to as "task profiling".

For example, the master device 800 may transfer the task descriptor to a profiling edge 820 before scheduling, in operation 831. The profiling edge 820 may include both a CPU and a GPU. The profiling edge 820 may be included in the master device 800, according to an embodiment of the disclosure. Alternatively, the profiling edge 820 may be an external device of the master device 800, and may be a device capable of performing data input and output with the master device 800. For example, the profiling edge 820 may be a device including both a CPU and GPU among task processing devices. Alternatively, the profiling edge 820 may be an edge dedicated for profiling.

The profiling edge 820 may process the task 821 on the basis of the obtained task descriptor. The profiling edge 820 may perform the task 821 using the CPU during a predetermined period of time, and may also perform the task 821 using both the CPU and the GPU during a predetermined period of time. The profiling edge 820 may identify information required for processing the task 821 on the basis of the processing result. For example, when only the CPU is used, the information required for processing the task 821 may include CPU edge test information 822 including an LLC hit ratio and a main memory bandwidth. When both the GPU and CPU are used, the information required for processing the task 821 may include GPU edge test information 823 including an LLC hit ratio, a main memory bandwidth, a GPO occupancy, and a GPU memory bandwidth. The LLC hit ratio of the CPU and the main memory bandwidth when only the CPU is used may be different from the LLC hit ratio of the CPU and the main memory bandwidth when both the CPU and GPU are used. If GPU-accelerated computing is performed using both the CPU and GPU, the GPU performs a computational intensive operation, and the CPU performs the remaining codes. If the task is performed using only the CPU, the CPU processes all operations. Accordingly, the CPU LLC hit ratio or main memory bandwidth identified on the basis of the result of performing task profiling using both the GPU and CPU may not be suitable as profiling data when a task is distributed to a task processing device that supports only a CPU. Accordingly, the profiling edge 820 may perform task profiling using both the CPU and GPU, and may perform task profiling using only the CPU. The CPU edge test information 822 may be used when one of task processing devices that support only CPUs is selected. The GPU edge test information 823 may be used when one of task processing devices that support GPUs is selected.

The profiling edge 820 may transfer information required for processing the task 821 to the master device 800, and the master device 800 may store the same as profile data 824. If the profiling edge 820 is included in the master device 800 or the master device 800 directly performs task profiling, the master device 800 may identify the information required for processing the task 821 in operation 832 and may store the same as the profile data 824.

The master device 800 may, for example, update the profile data 824 in the task descriptor 812 in operation 833. In operation 834, the task manager 816 may proceed with task scheduling on the basis of the profile data. For example, the task manager 816 may obtain real-time resource information from the task processing devices. The task manager 816 may select a task processing device to which the task descriptor 812 is to be transferred using the real-time resource information of each task processing device and the profile data 824. The task manager 816 may distribute a task to a task processing device which is expected to have the lowest degree of resource competition when the task is distributed. As another example, the task manager 816 may identify the real-time resource information of the task processing devices, and may identify a parameter indicating at least one of the amount of resources used, the amount of idle resources, or the degree of resource competition of each of the task processing devices when the profile data 824 is applied. The task manager 816 may distribute a task to a task processing device which is expected to have the lowest degree of resource competition.

The task manager 816 may manage task processing devices by dividing them into task processing devices supporting only CPUs, and task processing devices supporting GPUs, as described above. If the task manager 816 desires to distribute a task to one of the task processing devices that support only CPUs, the task manager 816 may select a task processing device on the basis of the CPU edge test information 822. If the task manager 816 desires to distribute a task to one of the task processing devices that support GPUs, the task manager 816 may select a task processing device on the basis of the GPU edge test information 823.

Profiling may be performed during, for example, a predetermined period of time. Alternatively, for a task associated with a manufacturing process, profiling may be performed for each product. A time or a unit for profiling may not be limited.

Figure 8B:
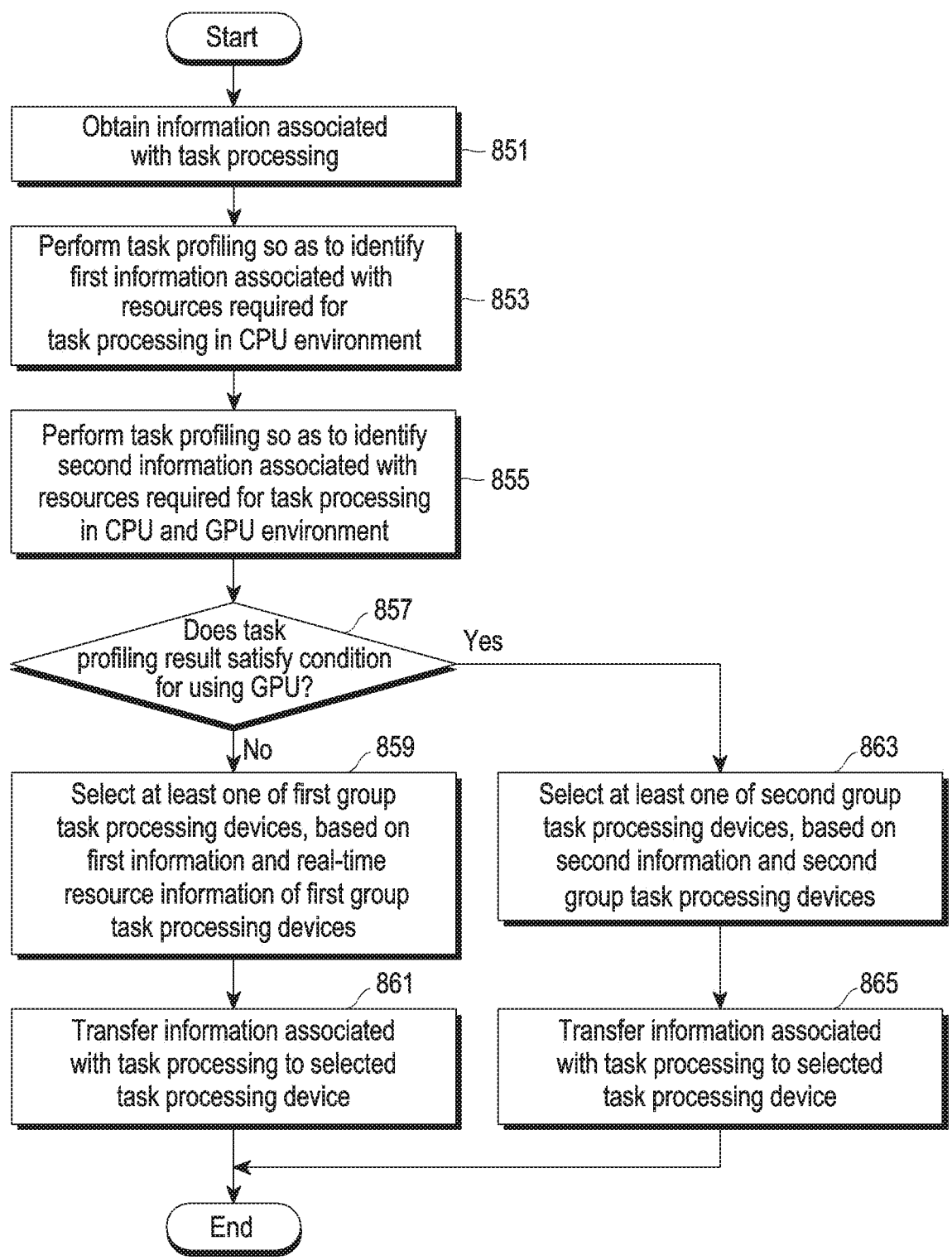
FIG. 8B is a flowchart illustrating operations of a master device according to embodiments of the disclosure.

FIG. 8B is a flowchart illustrating operations of a master device according to embodiments of the disclosure.

Referring to FIG. 8B, in operation 851, the master device 100 according to embodiments of the disclosure may obtain information associated with task processing. In operation 853, the master device 100 may perform task profiling so as to identify first information (e.g., the CPU edge test information 822 of FIG. 8A) associated with resources required for task processing in a CPU environment. For example, even when both a CPU and GPU are used, the master device 100 may not distribute an operation that task profiling requires to a GPU, but may perform the operation using a CPU. In operation 855, the master device 100 may perform task profiling so as to identify second information (e.g., the GPU edge test information 823 of FIG. 8A) associated with resources required for task processing in a CPU and GPU environment. The master device 100 may perform an operation that task profiling requires using both a CPU and GPU, and may identify the second information associated with resources required for task processing in the CPU and GPU environment. As described above, the task profiling may be performed by an external device. In this instance, the master device 100 may transmit the information associated with task processing to the external device and, in response thereto, may receive information required for task processing including the first information and the second information. The master device 100 may transmit, to the external device, a command to perform task processing using only a CPU and a command to perform task processing using both a CPU and GPU. Alternatively, if the master device 100 requests task profiling, the external device (e.g., a profiling edge) may perform task processing using only a CPU and may perform task processing using only a GPU and may transmit, to the master device 100, first information and second information identified respectively by the above-described task processing.

In operation 857, the master device 100 may identify whether the task profiling result satisfies a condition for using a GPU. The master device 100 may determine to use a GPU if the task requires a large amount of operations. For example, if the task profiling result shows that a GO exceeds a threshold GO, the master device 100 may identify that the task profiling result satisfies the condition for using a GPU. Alternatively, if a GPU memory bandwidth exceeds a threshold GPU memory bandwidth, the master device 100 may identify that the task profiling result satisfies a condition for using a GPU. Identifying whether the condition for using a GPU is satisfied on the basis of a GO and a GPU memory bandwidth is merely for illustrative purpose. The master device 100 may use any parameter associated with the amount of operations required for task processing, so as to identify whether to use a GPU for task processing.

If it is identified that the condition for using a GPU is not satisfied, the master device 100 may select at least one of first group task processing devices on the basis of the first information and real-time resource information of the first group task processing devices in operation 859. The first group task processing devices may be a group of task processing devices supporting only CPUs. For example, if the master device 100 adds a task to process to the first group task processing devices on the basis of the first information and the real-time resource information of the first group task processing devices supporting only CPUs, the master device 100 may select a task processing device that is expected to have the lowest amount of resources used to have the largest amount of idle resources, or to have the lowest degree of resource competition. In operation 861, the master device 100 may transfer the information associated with task processing to the selected task processing device.

If it is identified that the condition for using a GPU is satisfied, the master device 100 may select at least one of the second group task processing devices on the basis of the second information and real-time resource information of the second group task processing devices in operation 863. The second group task processing devices may be a group of task processing devices supporting GPUs. As another example, if the master device 100 adds a task to process to the second group task processing devices on the basis of the second information and the real-time resource information of the second group task processing devices supporting GPUs, the master device 100 may select a task processing device that is expected to have the lowest amount of resources used to have the largest amount of idle resources, or to have the lowest degree of resource competition. In operation 865, the master device 100 may transfer the information associated with task processing to the selected task processing device.

Figure 9A:
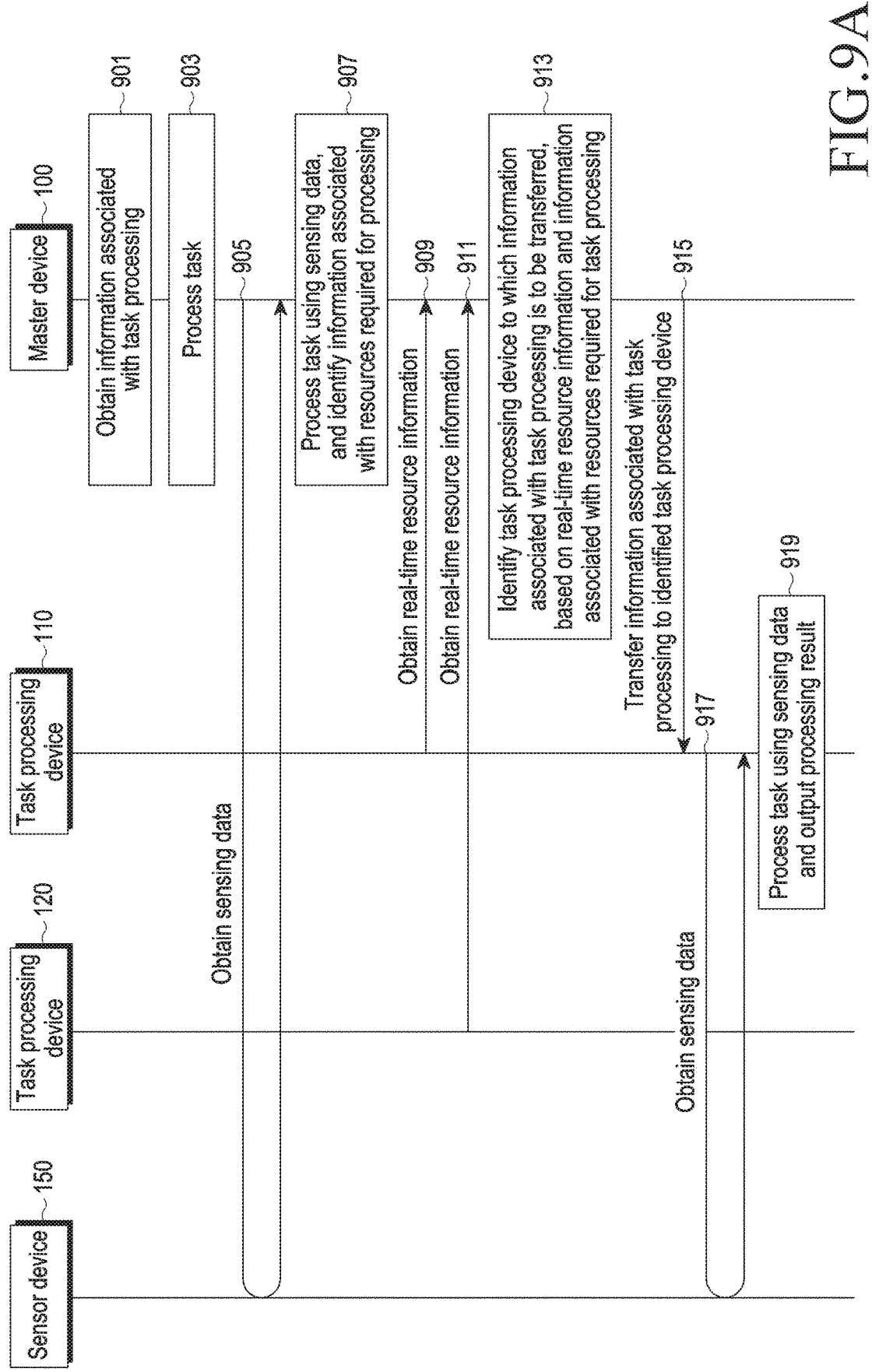
FIG. 9A is a flowchart illustrating operations of a master device, a task processing device, and a sensor device according to embodiments of the disclosure.

FIG. 9A is a flowchart illustrating operations of a master device, a task processing device, and a sensor device according to embodiments of the disclosure.

Referring to FIG. 9A, the master device 100 may obtain information associated with task processing in operation 901. In operation 903, the master device 100 may process a task on the basis of the obtained information associated with task processing. The task may include, for example, a code for obtaining input data from the sensor device 150. In operation 905, the master device 100 may obtain sensing data from the sensor device 150 during a task processing process. In operation 907, the master device 100 may process the task using the sensing data, and may identify information associated with resources required for task processing.

In operation 909, the master device 100 may obtain real-time resource information from the task processing device 110. In operation 911, the master device 100 may obtain real-time resource information from the task processing device 120. In operation 913, the master device 100 may identify a task processing device to which the information associated with task processing is to be transmitted on the basis of the real-time resource information and the information associated with resources required for task processing. For example, the master device 100 may preferentially select a task processing device which has the amount of idle resources larger than the amount of resources expected to be required for task processing.

Figure 9B:
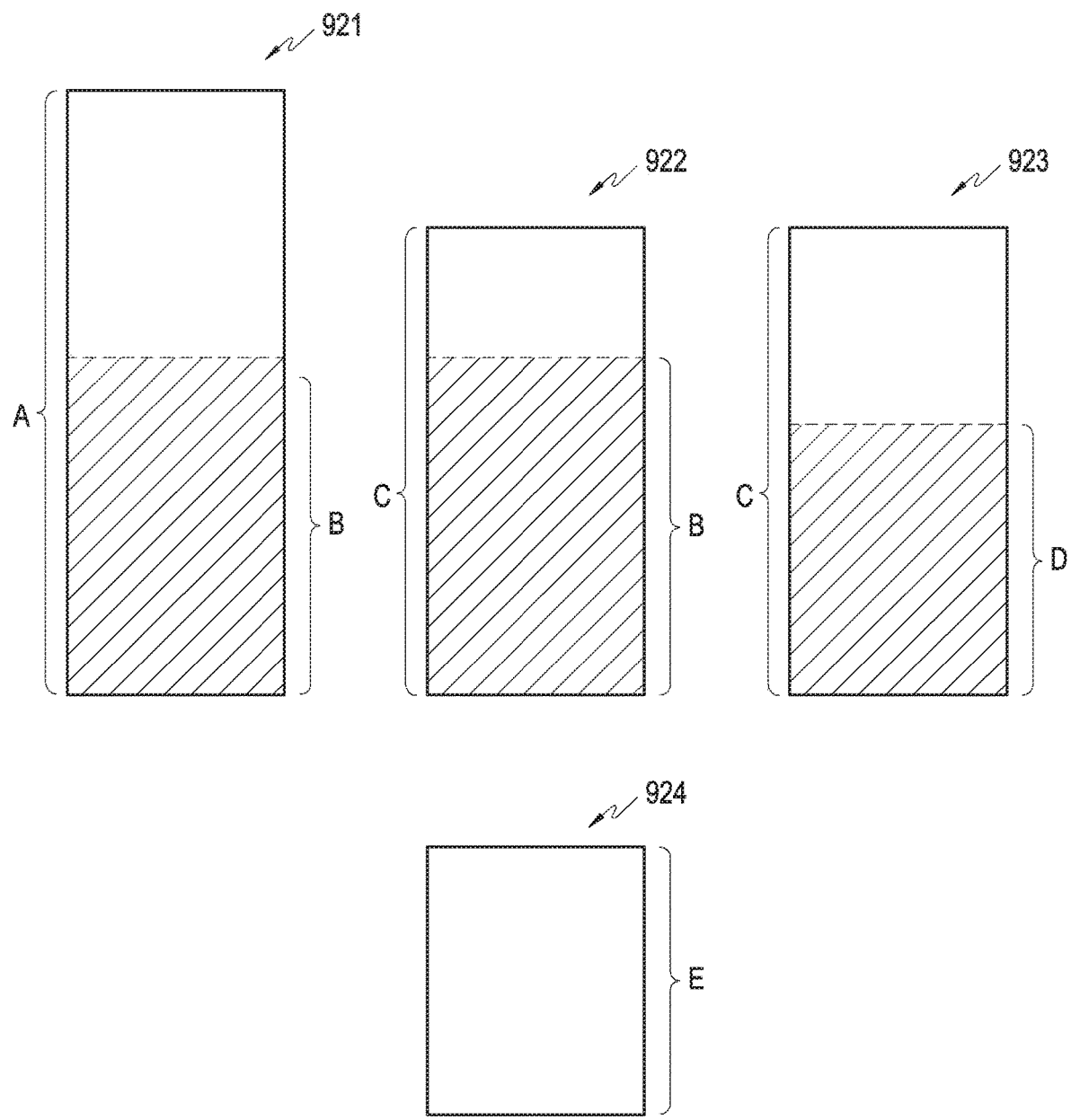
FIG. 9B is a diagram illustrating idle resources and expected resources for processing a task according to embodiments of the disclosure.

FIG. 9B is a diagram illustrating idle resources and expected resources for processing a task according to embodiments of the disclosure.

Referring to FIG. 9B, the master device 100 may manage information 921, 922, and 923 associated with resources for three task processing devices. As described with reference to FIG. 2C, the resource information 921, 922, and 923 of FIG. 9B are illustrated in order to merely describe the concept of an amount of idle resources. The master device 100 may manage various parameters related to the amount of idle resources. The units "A", "B", "C", "D", "E", or the like in FIG. 9B may indicate one of an LLC hit ratio, a main memory bandwidth, a GO, or a GPU memory bandwidth, or may be obtained on the basis of at least one of an LLC hit ratio, a main memory bandwidth, a GO, or a GPU memory bandwidth.

The master device 100 may identify information 924 indicating the amount of resources required for task processing according to the task profiling result. For example, it is assumed that the amount of resources required for task processing is E. The master device 100 may identify that the amount of idle resources identified on the basis of the resource information 922 of a second task processing device is smaller than the amount of resources required for task processing. The master device 100 may exclude the second task processing device from candidate task processing devices to which the task is to be distributed. The master device 100 may predict the resource information 921 of a first task processing device and the resource information 923 of a third task processing device when the task is distributed. The master device 100 may select a task processing device that is expected to have the lowest degree of resource competition on the basis of the prediction result. Alternatively, the master device 100 may select a task processing device having the largest amount of idle resources.

Returning to FIG. 9A, in operation 915, the master device 100 may transfer the information associated with task processing to the identified task processing device. For example, it is assumed that the task processing device 110 is selected. The master device 100 may transfer the information associated with task processing to the task processing device 110. The task processing device 110 may process the task on the basis of the information associated with task processing. In operation 917, the task processing device 110 may obtain sensing data from the sensor device 150. In operation 919, the task processing device 110 may process the task using the sensing data, and may output the processing result.

Figure 10A:
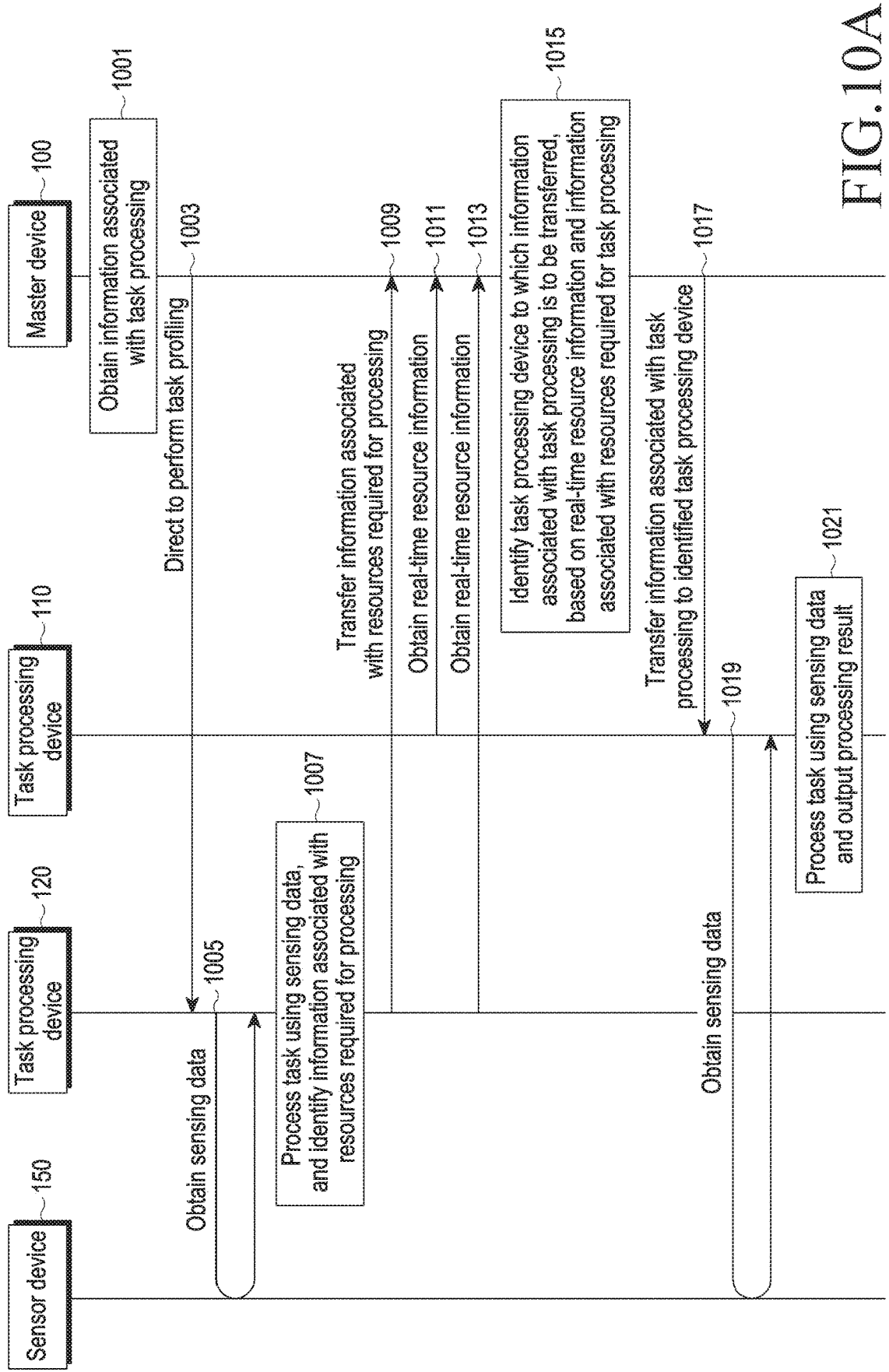
FIG. 10A is a flowchart illustrating operations of a master device, a task processing device, and a sensor device according to embodiments of the disclosure.

FIG. 10A is a flowchart illustrating operations of a master device, a task processing device, and a sensor device according to embodiments of the disclosure.

Referring to FIG. 10A, the master device 100 may obtain information associated with task processing in operation 1001. The master device 100 may select a task processing device that is to perform task profiling from among a plurality of task processing devices. For example, the master device 100 may select a task processing device that is to perform task profiling on the basis of information associated with the amount of resources that the plurality of task processing devices uses in real time. The master device 100 may select a task processing device that uses the lowest amount of resources in real time. Alternatively, the master device 100 may select a task processing device including a CPU and a GPU. As another example, the master device 100 may select a task processing device that uses the lowest amount of resources in real time among the task processing devices including CPUs and GPUs. For example, it is assumed that the master device 100 selects the task processing device 120 as a task processing device to perform task profiling. In operation 1003, the master device 100 may direct the task processing device 120 to perform task profiling. The master device 100 may transfer the information associated with task processing, that is, a task descriptor, to the task processing device 120.

In operation 1005, the task processing device 120 may obtain sensing data from the sensor device 150 in order to process a task. In operation 1007, the task processing device 120 may process the task using the sensing data, and may identify information associated with resources required for task processing. If the task processing device 120 is processing a previously distributed task, the task processing device 120 may process the task together with the task for profiling. In this instance, the task processing device 120 may identify information required for processing for each task. Accordingly, the task processing device 120 may transfer the information required for processing the task associated with profiling to the master device 100. Alternatively, the task processing device 120 may suspend processing of the previously distributed task, and may process the task for profiling. The task processing device 120 may identify the information required for task processing on the basis of the task profiling result. In operation 1009, the task processing device 120 may transfer the information associated with resources required for task processing to the master device 100.

In operation 1011, the master device 100 may obtain real-time resource information from the task processing device 110. In operation 1013, the master device 100 may obtain real-time resource information from the task processing device 120. In operation 1015, the master device 100 may determine a task processing device to which the information associated with task processing is to be transmitted on the basis of the real-time resource information and the information associated with resources required for task processing. As described above, the master device 100 may select a task processing device which has the largest amount of idle resources or the lowest degree of resource competition when the task is distributed. For example, the master device 100 may identify the task processing device 110 to be a task processing device to which the information for task processing is to be transferred.

In operation 1017, the master device 100 may transfer the information associated with task processing to the identified task processing device 110. The task processing device 110 may process the task on the basis of the information associated with task processing. In operation 1019, the task processing device 110 may obtain sensing data from the sensor device 150. In operation 1021, the task processing device 110 may process the task using the sensing data, and may output the processing result.

Figure 10B:
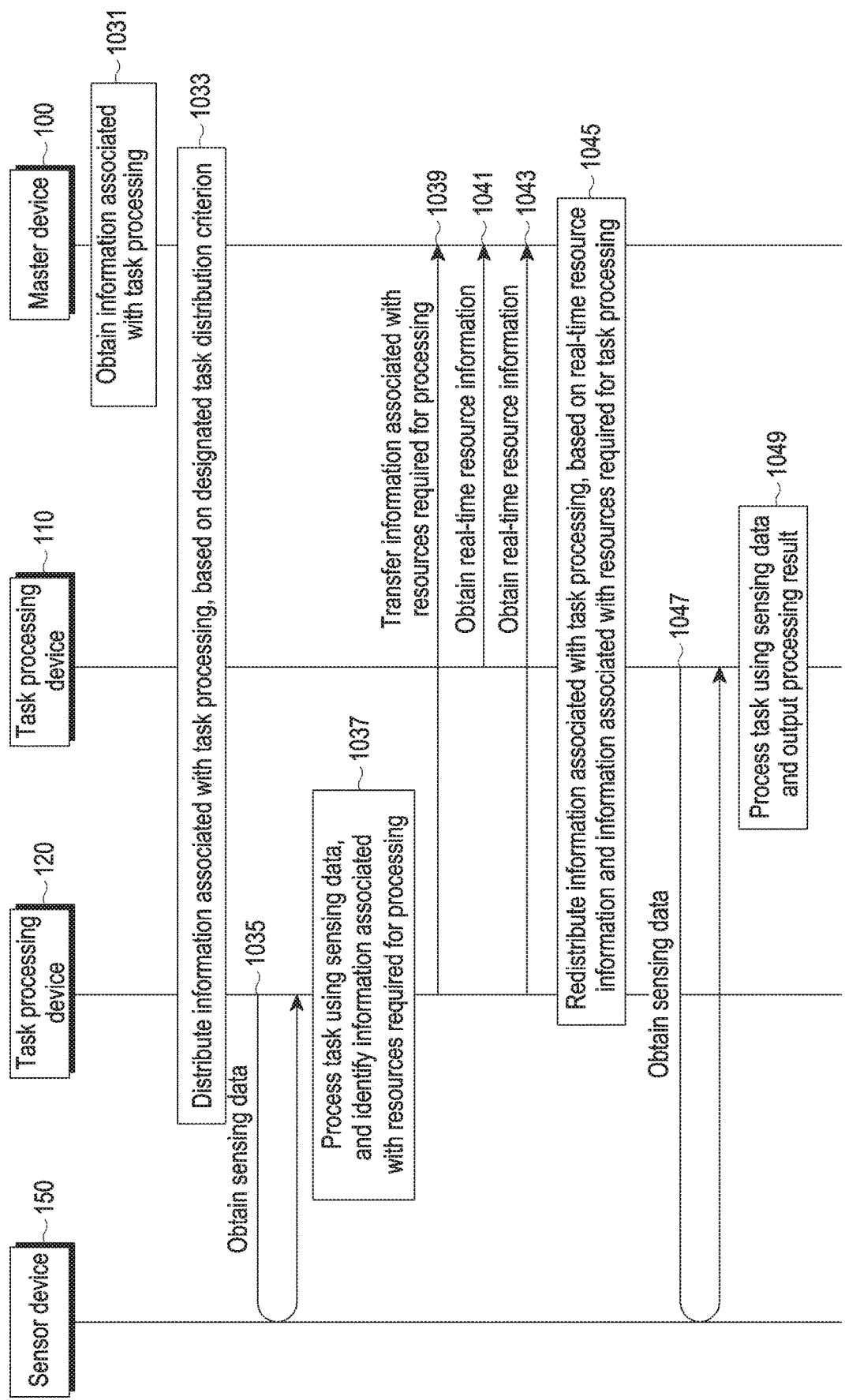
FIG. 10B is another flowchart illustrating operations of a master device, a task processing device, and a sensor device according to embodiments of the disclosure.

FIG. 10B is another flowchart illustrating operations of a master device, a task processing device, and a sensor device according to embodiments of the disclosure.

Referring to FIG. 10B, in operation 1031, the master device 100 may obtain information associated with task processing. In operation 1033, the master device 100 may distribute the information associated with task processing on the basis of a designated task distribution criterion. For example, the master device 100 may randomly distribute a task since it is before task profiling. Alternatively, the master device 100 may distribute a task on the basis of real-time resource information of the task processing devices. For example, it is assumed that the master device 100 distributes a task to the task processing device 120.

In operation 1035, the task processing device 120 may obtain sensing data from the sensor device 150. In operation 1037, the task processing device 120 may process the task using the sensing data, and may identify information associated with resources required for task processing. In operation 1039, the task processing device 120 may transfer the information associated with resources required for processing to the master device 100.

In operation 1041, the master device 100 may obtain real-time resource information from the task processing device 110. In operation 1043, the master device 100 may obtain real-time resource information from the task processing device 120. In operation 1045, the master device 100 may redistribute the information associated with task processing on the basis of the real-time resource information and the information associated with resources required for task processing. For example, the master device 100 may expect that the degree of resource competition of the task processing device 110 will be lower than the degree of resource competition of the task processing device 120 if task processing is performed. The master device 100 may redistribute the information associated with task processing to the task processing device 110. If the degree of resource competition of the task processing device 120 is expected to be lower than the degree of resource competition of the task processing device 110 when task processing is performed, the master device 100 may enable the task processing device 120 to continue task processing.

In operation 1047, the task processing device 110 may obtain sensing data from the sensor device 150. In operation 1049, the task processing device 110 may process the task using the sensing data, and may output the processing result.

Figure 11:
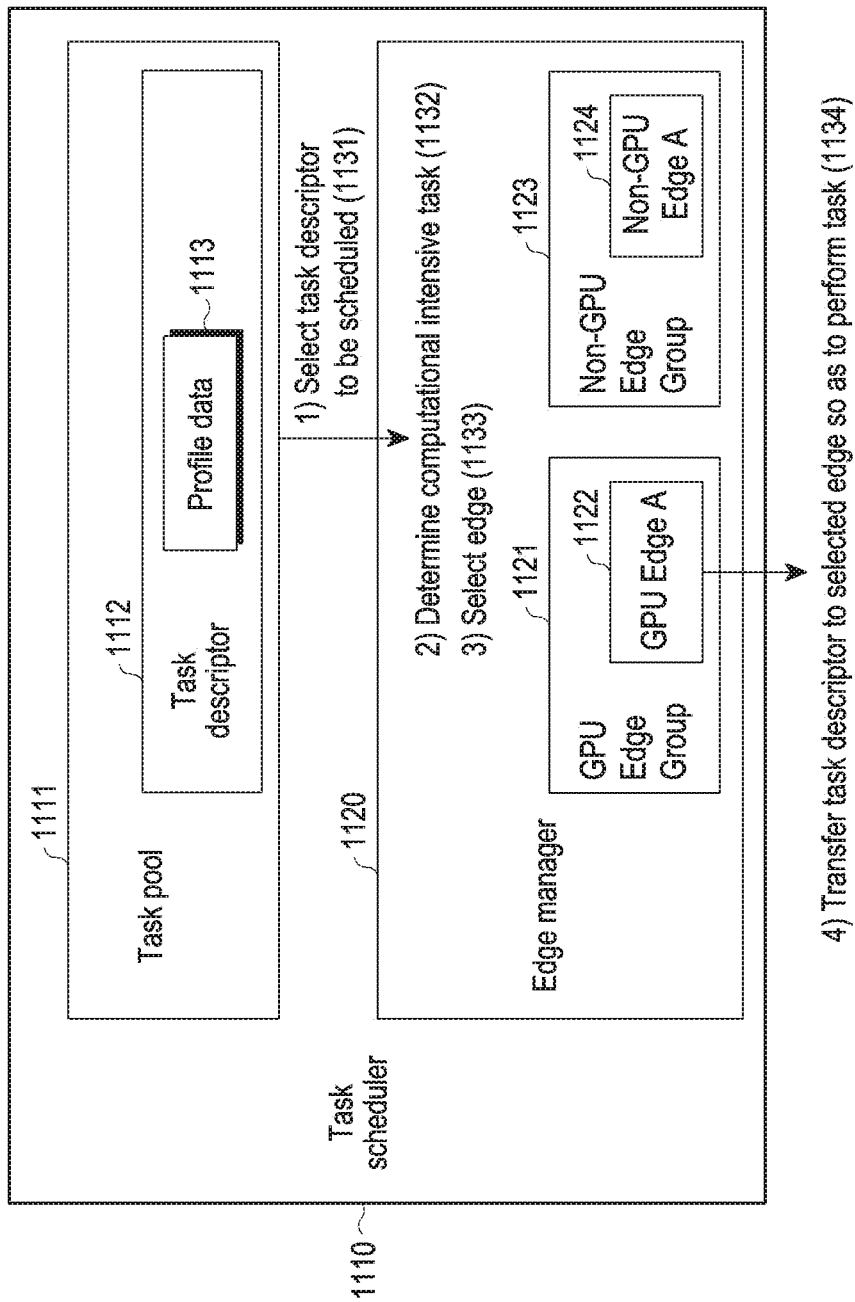
FIG. 11 is a block diagram illustrating a task scheduler that identifies whether to use a graphics processing unit (GPU) according to embodiments of the disclosure.

FIG. 11 is a block diagram illustrating a task scheduler that identifies whether to use a GPU according to embodiments of the disclosure.

Referring to FIG. 11, a task scheduler 1110 according to embodiments of the disclosure may include a task pool 1111 and an edge manager 1120. A task descriptor 1112 may be stored in the task pool 1111. The task descriptor 1112 may include profile data 1113. The profile data 1113 may include, for example, first information (e.g., the CPU edge test information 822) on the basis of a task profiling result in a CPU only environment and second information (e.g., the GPU edge test information 823). In operation 1131, an edge manager 1120 may select the task descriptor 1112 to be scheduled.

The edge manager 1120 may determine whether a task to be scheduled is a computational intensive task in operation 1132. If it is determined that the task to be scheduled is the computational intensive test, the edge manager 1120 may distribute the corresponding task to a task processing device that supports a GPU. For example, the edge manager 1120 may perform the operation of FIG. 12 so as to determine whether the task is the computational intensive task. The edge manager 1120 may select an edge on the basis of whether the task is the computational intensive task in operation 1133. The edge manager 1120 may manage edges by dividing them into a GPU edge group 1121 and a non-GPU edge group 1123. The edge manager 1120 may manage real-time resource information of an edge that supports a GPU (e.g., GPU edge A 1122). The edge manager 1120 may manage real-time resource information for each task that each edge supporting a GPU is processing. The edge manager 1120 may manage real-time resource information of an edge that does not support a GPU (e.g., non-GPU edge A 1124). The edge manager 1120 may manage real-time resource information for each task that each non-GPU edge is processing. If it is identified that the task to be scheduled is the computational intensive task, the edge manager 1120 may distribute the task to one of the edges belonging to the GPU edge group 1121. For example, the edge manager 1120 may select an edge that is expected to have the lowest degree of resource competition when the task is distributed from among the edges of the GPU edge group 1121. If it is identified that the task to be scheduled is not the computational intensive task, the edge manager 1120 may distribute the task to one of the edges belonging to the non-GPU edge group 1123. As another example, the edge manager 1120 may select an edge that is expected to have the lowest degree of resource competition when the task is distributed from among the edges of the non-GPU edge group 1123. In operation 1134, the edge manager 1120 may transfer the task descriptor to the selected edge so as to execute the task.

Figure 12:
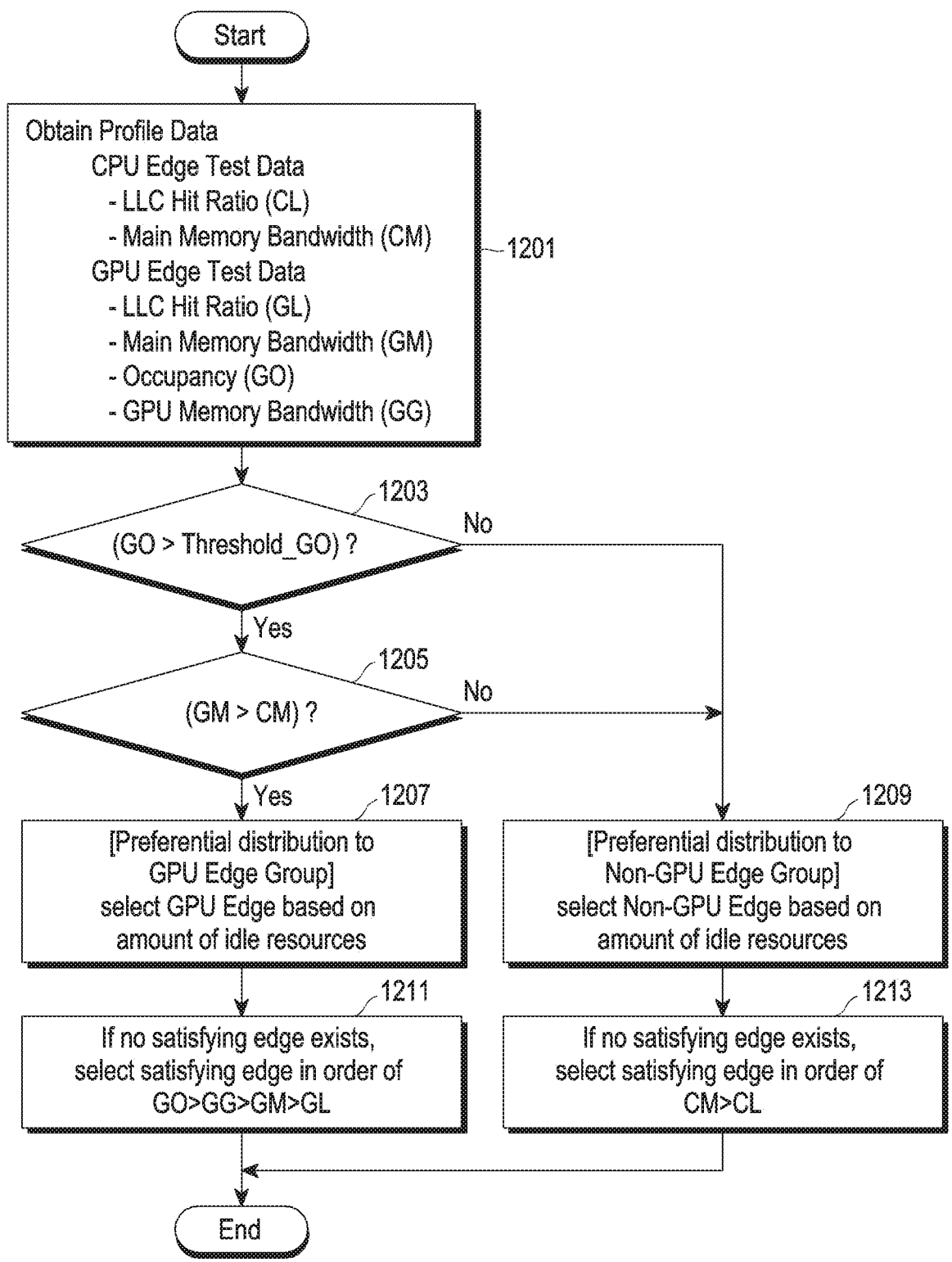
FIG. 12 is a flowchart illustrating an operation method of a master device that identifies whether to use a GPU according to embodiments of the disclosure.

FIG. 12 is a flowchart illustrating an operation method of a master device that identifies whether to use a GPU according to embodiments of the disclosure.

Referring to FIG. 12, the master device 100 may obtain profile data in operation 1201. The profile data may include CPU edge test data and GPU edge test data. The CPU edge test data may be data identified from the result of task profiling performed in a CPU only environment, and the GPU edge test data may be data identified from the result of task profiling performed in a CPU and GPU environment. The CPU edge test data may include an LLC hit ratio (CL) in the CPU only environment and a main memory bandwidth (CM) in the CPU only environment. The GPU edge test data may include an LLC hit ratio (GL) of a CPU in a GPU and CPU environment, a main memory bandwidth (GM) in the GPU and CPU environment, a GO in the GPU and CPU environment, and a GPU memory bandwidth (GG) in the GPU and CPU environment.

In operation 1203, the master device 100 may identify whether the GO exceeds a threshold GO (threshold_GO). If it is identified that the GO exceeds the threshold GO (threshold_GO), the master device 100 may identify whether the main memory bandwidth (GM) in the GPU and CPU environment exceeds the main memory bandwidth (CM) in the CPU only environment in operation 1205. If the main memory bandwidth (GM) in the GPU and CPU environment exceeds the main memory bandwidth (CM) in the CPU only environment, it is identified that a corresponding task is a computational intensive task. If it is identified that the GO does not exceed the threshold GO (threshold_GO), or the main memory bandwidth (GM) in the GPU and CPU environment does not exceed the main memory bandwidth (CM) in the CPU only environment, the master device 100 may identify that a corresponding task is not a computational intensive task. The parameters and parameter comparison conditions in operations 1203 and 1205 are merely for illustrative purpose, and parameters and corresponding comparison conditions used for identifying whether a task corresponds to a computational intensive task are not limited to those shown. In addition, FIG. 13 determines whether a task is a computational intensive task by determining whether two conditions of operations 1203 and 1205 are satisfied. That is also for illustrative purpose. The number of comparison conditions is not limited to those shown, and whether a task is a computational intensive task may be determined when even a single condition is satisfied.

If it is identified that the corresponding task is the computational intensive task, the master device 100 may preferentially distribute the task to a GPU edge group in operation 1207. The master device 100 may select a GPU edge having the largest amount of idle resources among edges which have the amount of idle resources larger than the amount of used resources corresponding to the GO in the GPU and CPU environment and the GPU memory bandwidth (GG) in the GPU and CPU environment included in the profile data. That is, the master device 100 may select an edge which is expected to have the lowest degree of resource competition among edges which have the amount of idle resources larger than the amount of used resources corresponding to the GO in the GPU and CPU environment and the GPU memory bandwidth (GG) in the GPU and CPU environment included in the profile data. If an edge, which has the amount of idle resources larger than the amount of used resources corresponding to the GO in the GPU and CPU environment and the GPU memory bandwidth (GG) in the GPU and CPU environment is not identified, the master device 100 may select an edge on the basis of the designated order of parameters in operation 1211. For example, the master device 100 may select an edge having the largest amount of idle resources identified on the basis of the GO in the GPU and CPU environment, may select an edge having the largest amount of idle resources identified on the basis of the GPU memory bandwidth (GG) in the GPU and CPU environment, may select an edge having the largest amount of idle resource identified on the basis of the main memory bandwidth (GM) in the GPU and CPU environment, and/or may select an edge having the largest amount of idle resources identified on the basis of the LLC hit ratio (GL) of the CPU in the GPU and CPU environment. Here, priority may be set in order of the GO in the GPU and CPU environment, the GPU memory bandwidth (GG) in the GPU and CPU environment, the main memory bandwidth (GM) in the GPU and CPU environment, and the LLC hit ratio (GL) of the CPU in the GPU and CPU environment, but this is merely an example.

If it is identified that the corresponding task is not the computational intensive task, the master device 100 may preferentially distribute the task to a non-GPU edge group in operation 1209. The master device 100 may select a non-GPU edge having the largest amount of idle resources among edges which have the amount of idle resources larger than the amount of used resources corresponding to the LLC hit ratio (CL) in the CPU only environment and the main memory bandwidth (CM) in the CPU only environment included in the profile data. That is, the master device 100 may select an edge that is expected to have the lowest degree of resource competition among edges which have the amount of idle resources larger than the amount of used resources corresponding to the LLC hit ratio (CL) in the CPU only environment and the main memory bandwidth (CM) in the CPU only environment included in the profile data. If an edge, which has the amount of idle resources larger than the amount of used resources corresponding to the LLC hit ratio (CL) in the CPU only environment and the main memory bandwidth (CM) in the CPU only environment, is not identified, the master device 100 may select an edge on the basis of the designated order of parameters in operation 1213. As another example, the master device 100 may select an edge having the largest amount of idle resources identified on the basis of the main memory bandwidth (CM) in the CPU only environment, or may select an edge having the largest amount of idle resources identified on the basis of the LLC hit ratio (CL) in the CPU only environment. Here, priority may be set in order of the main memory bandwidth (CM) in the CPU only environment and the LLC hit ratio (CL) in the CPU only environment, but this is merely an example.

Figure 13:
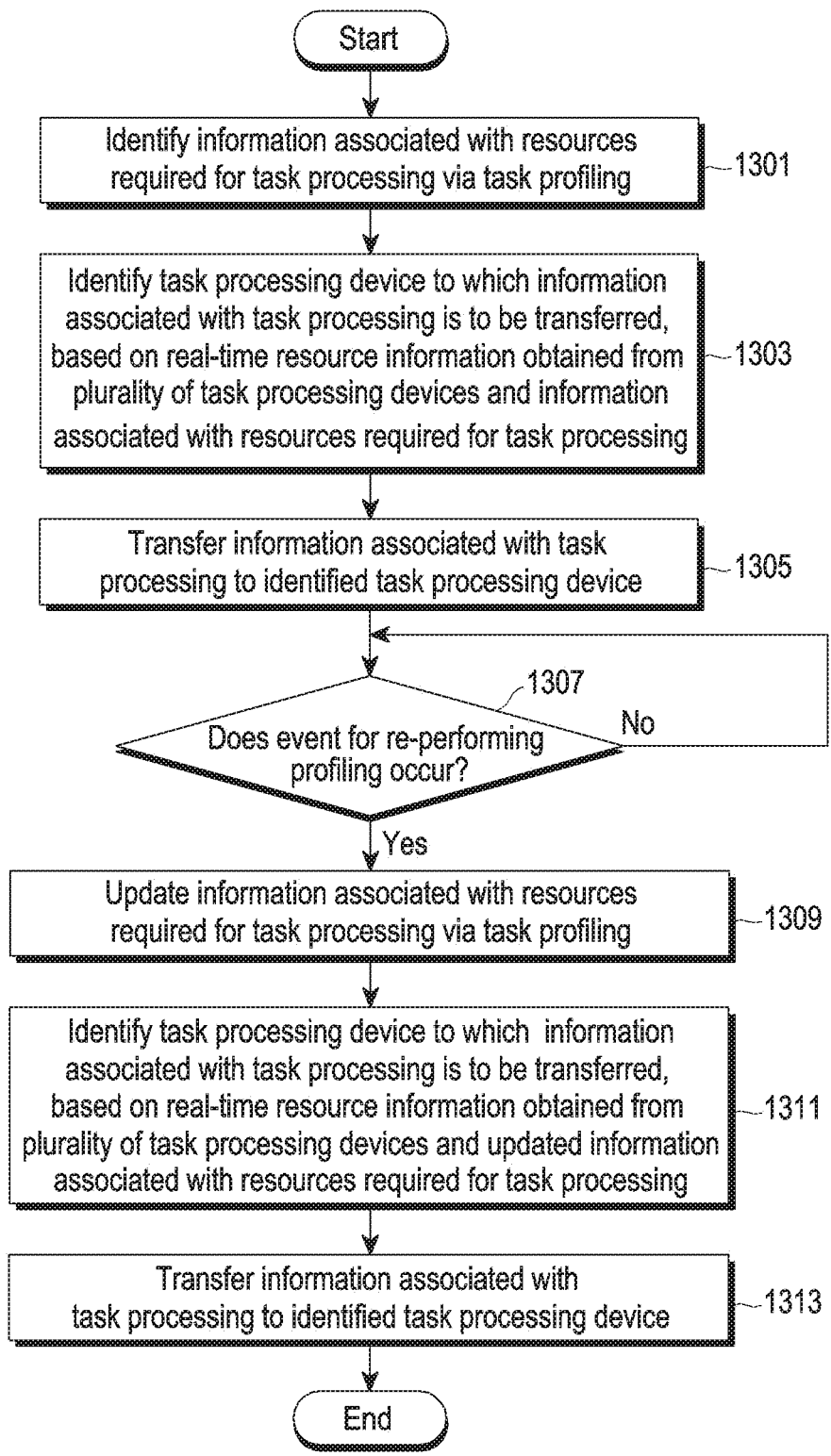
FIG. 13 is another flowchart illustrating an operation method of a master device according to embodiments of the disclosure.

FIG. 13 is another flowchart illustrating an operation method of a master device according to embodiments of the disclosure.

Referring to FIG. 13, the master device 100 may identify information associated with resources required for task processing via task profiling in operation 1301. The master device 100 may perform task profiling so as to identify information associated with resources required for task processing, or may obtain information associated with resources required for task processing from an external device that performs task profiling. In operation 1303, the master device 100 may identify a task processing device to which the information associated with task processing is to be transmitted on the basis of real-time resource information obtained from a plurality of task processing devices and the information associated with resources required for task processing. In operation 1305, the master device 100 may transfer the information associated with task processing to the identified task processing device.

In operation 1307, the master device 100 may identify whether an event for re-performing profiling occurs. For example, the master device 100 may re-perform profiling at predetermined intervals. As another example, if a task performance time or the amount of resources spent on performing a task increases, the master device 100 may determine to re-perform profiling. As another example, when at least one of a task processing algorithm or input/output information is changed, the master device 100 may determine to re-perform profiling. As described above, if the library version of the task is changed, if a parameter value is corrected, if the neural network structure of a learning algorithm is changed, or if the database to which a learning algorithm is to be applied is changed, a task descriptor is updated and the master device 100 may re-perform profiling in response to updating of the task descriptor.

If it is identified that the event for re-performing profiling occurs, the master device 100 may update the information associated with resources required for task processing via task profiling in operation 1309. In operation 1311, the master device 100 may identify a task processing device to which the information associated with task processing is to be transmitted on the basis of the real-time resource information obtained from the plurality of task processing devices and the updated information associated with the resources required for task processing. In operation 1313, the master device 100 may transfer the information associated with task processing to the identified task processing device.

Figure 14:
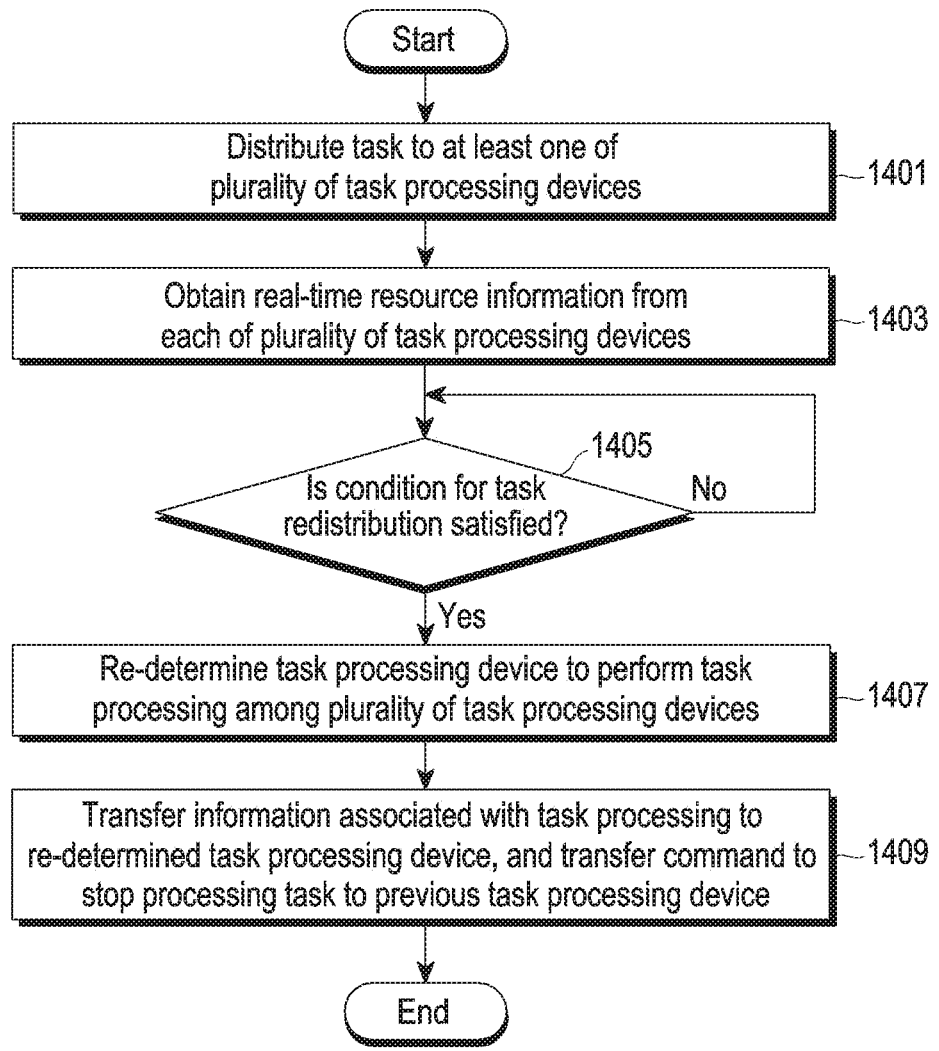
FIG. 14 is another flowchart illustrating an operation method of a master device according to embodiments of the disclosure.

FIG. 14 is another flowchart illustrating an operation method of a master device according to embodiments of the disclosure.

Referring to FIG. 14, the master device 100 may distribute a task to at least one of a plurality of task processing devices in operation 1401. The master device 100 may distribute a task to at least one task processing device on the basis of real-time resource information obtained from the task processing devices. The master device 100 may distribute a task by further using profile data. Accordingly, a task processing device may receive and process a distributed task. In operation 1403, the master device 100 may obtain real-time resource information from each of the plurality of task processing devices.

In operation 1405, the master device 100 may identify whether a condition for redistributing a task is satisfied. For example, if the degree of resource competition of a task processing device exceeds a designated value, the master device 100 may perform task redistribution. As another example, if the amount of idle resources of a task processing device is less than a threshold idle resource amount, the master device 100 may perform task redistribution. As another example, if a variation in the amount of resources used by a task processing device exceeds a threshold variation, the master device 100 may perform task redistribution.

In operation 1407, the master device 100 may redetermine a task processing device that is to perform task processing from among the plurality of task processing devices. The master device 100 may redetermine a task processing device that is to perform task processing from among the plurality of task processing devices on the basis of profile data of a task to be redistributed. In operation 1409, the master device 100 may transfer information associated with task processing to the redetermined task processing device, and may transfer a command to suspend task processing to a previous task processing device.

Figure 15:
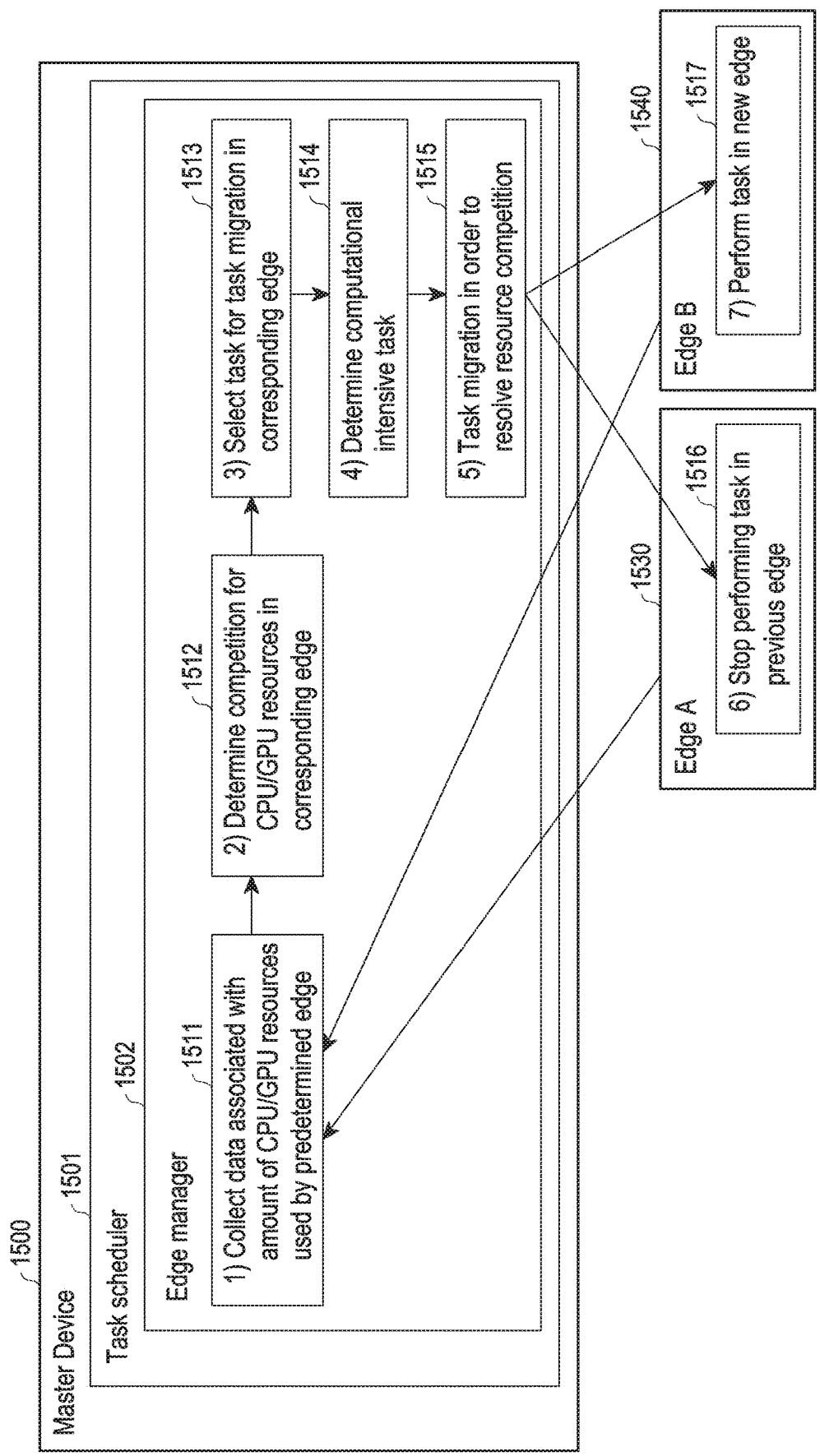
FIG. 15 is a block diagram illustrating a master device that performs task redistribution according to embodiments of the disclosure.

FIG. 15 is a diagram illustrating a master device that performs task redistribution according to embodiments of the disclosure.

Referring to FIG. 15, a master device 1500 (e.g., the master device 100) may include a task scheduler 1501, and the task scheduler 1501 may include an edge manager 1502. The edge manager 1502 may collect data associated with the amount of CPU/GPU resources used by a predetermined edge in operation 1511. An edge may transmit real-time resource information to the master device 1500 and accordingly, the edge manager 1502 may collect data associated with the amount of CPU/GPU resources used by a predetermined edge. For example, the edge manager 1502 may obtain at least one of the LLC hit ratio, main memory bandwidth, GO, or GPU memory bandwidth of a predetermined edge.

In operation 1512, the edge manager 1502 may determine whether competition for GPU/CPU resources occurs in the corresponding edge. The master device 1500 may determine whether resource competition occurs in the corresponding edge on the basis of a variation in at least one of the LLC hit ratio, main memory bandwidth, GO, or GPU memory bandwidth. For example, the master device 1500 may identify that resource competition occurs in the corresponding edge if a variation in at least one of the LLC hit ratio, main memory bandwidth, GO, or GPU memory bandwidth exceeds a threshold variation. The process of identifying whether resource competition occurs on the basis of a variation in a parameter will be described in detail with reference to FIG. 16. Alternatively, according to various embodiments of the disclosure, the master device 1500 may determine whether resource competition occurs on the basis of the obtained data associated with the amount of CPU/GPU resources used. As another example, the master device 1500 may store a condition which is associated with at least one of an LLC hit ratio, a main memory bandwidth, a GO, or a GPU memory bandwidth, and is used to determine whether resource competition occurs. The master device 1500 may identify whether information received from the corresponding edge satisfies the stored condition and, if the stored condition is satisfied, may determine that resource competition occurs in the corresponding edge. Alternatively, the master device 1500 may identify the amount of idle resources or the degree of resource competition on the basis of at least one of the LLC hit ratio, main memory bandwidth, GO, or GPU memory bandwidth and, if the amount of idle resources is less than a threshold idle resource amount or if the degree of resource competition exceeds a threshold resource competition degree, the master device 1500 may identify that resource competition occurs in the corresponding edge.

In operation 1513, the edge manager 1502 may select a task for task migration from the corresponding edge. For example, the edge manager 1502 may obtain, from the corresponding edge, real-time resource information for each task that is being processed in the edge in addition to real-time resource information of the entire edge. The edge manager 1502 may identify at least one task to be a task for task migration in descending order of resource amount used. The edge manager 1502 may determine to perform task migration of the task to such a degree that resource competition does not occur in the corresponding edge. In operation 1514, the edge manager 1502 may determine whether the task that is to migrate is a computational intensive task. The edge manager 1502 may perform task migration in order to resolve resource competition in operation 1515. On the basis of whether the task is a computational intensive task, the edge manager 1502 may perform task migration such that the corresponding task migrates to one of a GPU edge group or a non-GPU edge group. In addition, the edge manager 1502 may determine an edge that is expected to have no resource competition occurs when the corresponding task migrates to the edge, to be an edge to which the task is to migrate.

The edge manager 1502 may determine, for example, edge B 1540 to be the edge to which the task is to migrate. The edge manager 1502 may transfer a task suspension command to edge A 1530 which has been performing the task. In addition, the edge manager 1502 may transfer a task descriptor to the new edge B 1540. In operation 1516, the edge A 1530 that obtains the task suspension command may stop processing the task. In operation 1517, the edge B 1540 that obtains the task descriptor may perform the task.

Figure 16:
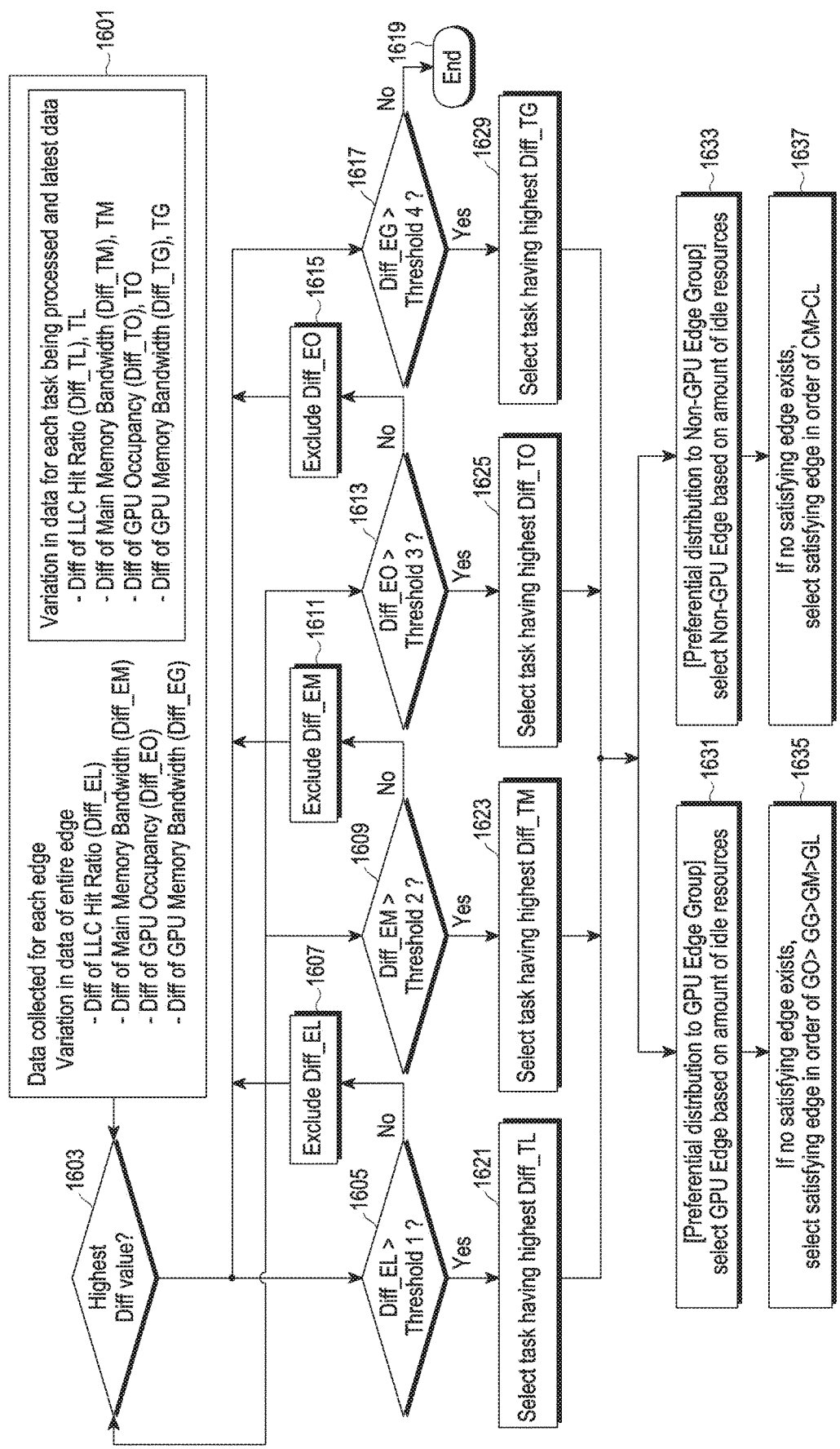
FIG. 16 is a flowchart illustrating an operation method of a master device according to embodiments of the disclosure.

FIG. 16 is a flowchart illustrating an operation method of a master device according to embodiments of the disclosure.

Referring to FIG. 16, the master device 100 according to various embodiments of the disclosure may identify data for each edge in operation 1601. The master device 100 may identify a variation in data of a predetermined edge, for example, a variation in real-time resource information. For example, the master device 100 may identify a variation (Diff_EL) in the LLC hit ratio, a variation (Diff_EM) in the main memory bandwidth, a variation (Diff_EO) in the GO, and a variation (Diff_EG) in the GPU memory bandwidth of the entirety of the corresponding edge. The master device 100 may check a parameter before distributing a task to the predetermined edge and check the parameter after distributing the task to the predetermined edge, so as to identify a variation in data. Alternatively, the predetermined edge may report a variation in data to the master device 100.

The master device 100 may identify a variation in data of each of at least one task being processed in the predetermined edge, as opposed to identifying a variation in data of the entirety of the predetermined edge, and may identify the latest data for each task. As another example, the master device 100 may identify a variation (Diff_TL) in the LLC hit ratio, a variation (Diff_TM) in the main memory bandwidth, a variation (Diff_TO) in the GO, and a variation (Diff_TG) in the GPU memory bandwidth of each task being processed in the corresponding edge. Also, the master device 100 may identify an LLC hit ration (TL), main memory bandwidth (TM), GO (TO), and GPU memory bandwidth (TG), which are the latest data for each task. If the master device 100 obtains data from an edge that supports only a CPU, the master device 100 may identify information associated with the main memory bandwidth and the LLC hit ratio associated with the CPU, and variation information. In operation 1603, the master device 100 may then identify a highest Diff_value.

In operation 1605, the master device 100 may identify whether a variation (Diff_EL) of the LLC hit ratio of the entirety of the predetermined edge exceeds a first threshold value (threshold 1). If the variation (Diff_EL) of the LLC hit ratio of the entirety of the predetermined edge does not exceed the first threshold value (threshold 1), the master device 100 may exclude additional analysis on the variation (Diff_EL) of the LLC hit ratio of the entirety of the predetermined edge in operation 1607. In this instance, the master device 100 may identify whether a variation (Diff_EM) of the main memory bandwidth of the entirety of the predetermined edge exceeds a second threshold value (threshold 2) in operation 1609. If the variation (Diff_EM) of the main memory bandwidth of the entirety of the predetermined edge does not exceed the second threshold value (threshold 2), the master device 100 may exclude additional analysis on the variation (Diff_EM) of the main memory bandwidth of the entirety of the predetermined edge in operation 1611. In this instance, the master device 100 may identify whether a variation (Diff_EO) of the GO of the entirety of the predetermined edge exceeds a third threshold value (threshold 3) in operation 1613. If the variation (Diff_EO) of the GO of the entirety of the predetermined edge does not exceed the third threshold value (threshold 3), the master device 100 may exclude additional analysis on the variation (Diff_EO) of the GO of the entirety of the predetermined edge in operation 1615. In this instance, the master device 100 may identify whether a variation (Diff_EG) of the GPU main memory of the entirety of the predetermined edge exceeds a fourth threshold value (threshold 4) in operation 1617. If the variation (Diff_EG) of the GPU main memory of the entirety of the predetermined edge does not exceed the fourth threshold value (threshold 4), the master device 100 may terminate the operation method of FIG. 16 in operation 1619. The order of determination in FIG. 16 is merely an example, and at least one of the data used for determination may be omitted.

If it is identified that the variation (Diff_EL) of the LLC hit ratio of the entirety of the predetermined edge exceeds the first threshold value (threshold 1) in operation 1605, the master device 100 may select a task having the highest variation (Diff_TL) in the LLC hit ratio in operation 1621. If it is identified that the variation (Diff_EM) of the main memory bandwidth of the entirety of the predetermined edge exceeds the second threshold value (threshold 2) in operation 1609, the master device 100 may select a task having the highest variation (Diff_TM) in the main memory bandwidth in operation 1623. If it is identified that the variation (Diff_EO) of the GO of the entirety of the predetermined edge exceeds the third threshold value (threshold 3) in operation 1613, the master device 100 may select a task having the highest variation (Diff_TO) in the GO in operation 1625. If it is identified that the variation (Diff_EG) of the GPU main memory of the entirety of the predetermined edge exceeds the fourth threshold value (threshold 4) in operation 1617, the master device 100 may select a task having the highest variation (Diff_TG) in the GPU main memory in operation 1629.

The master device 100 may then identify whether the selected task is a computational intensive task on the basis of at least some (e.g., TG and GO) of the latest data of the selected task. If it is identified that the selected task is the computational intensive task, the master device 100 may preferentially distribute the selected task to a GPU edge group in operation 1631. Selecting a GPU edge in consideration of the amount of idle resources in operation 1631 and selecting an edge on the basis of priority in operation 1635 have been described in detail with reference to operations 1307 and 1311 of FIG. 13, and detailed descriptions thereof will be omitted here. If it is identified that the selected task is not the computational intensive task, the master device 100 may preferentially distribute the selected task to a non-GPU edge group in operation 1633. Selecting a non-GPU edge in consideration of the amount of idle resources in operation 1633, and selecting an edge on the basis of priority in operation 1637 have been described in detail with reference to operations 1309 and 1313 of FIG. 13, and detailed descriptions thereof will also be omitted here.

Figure 17:
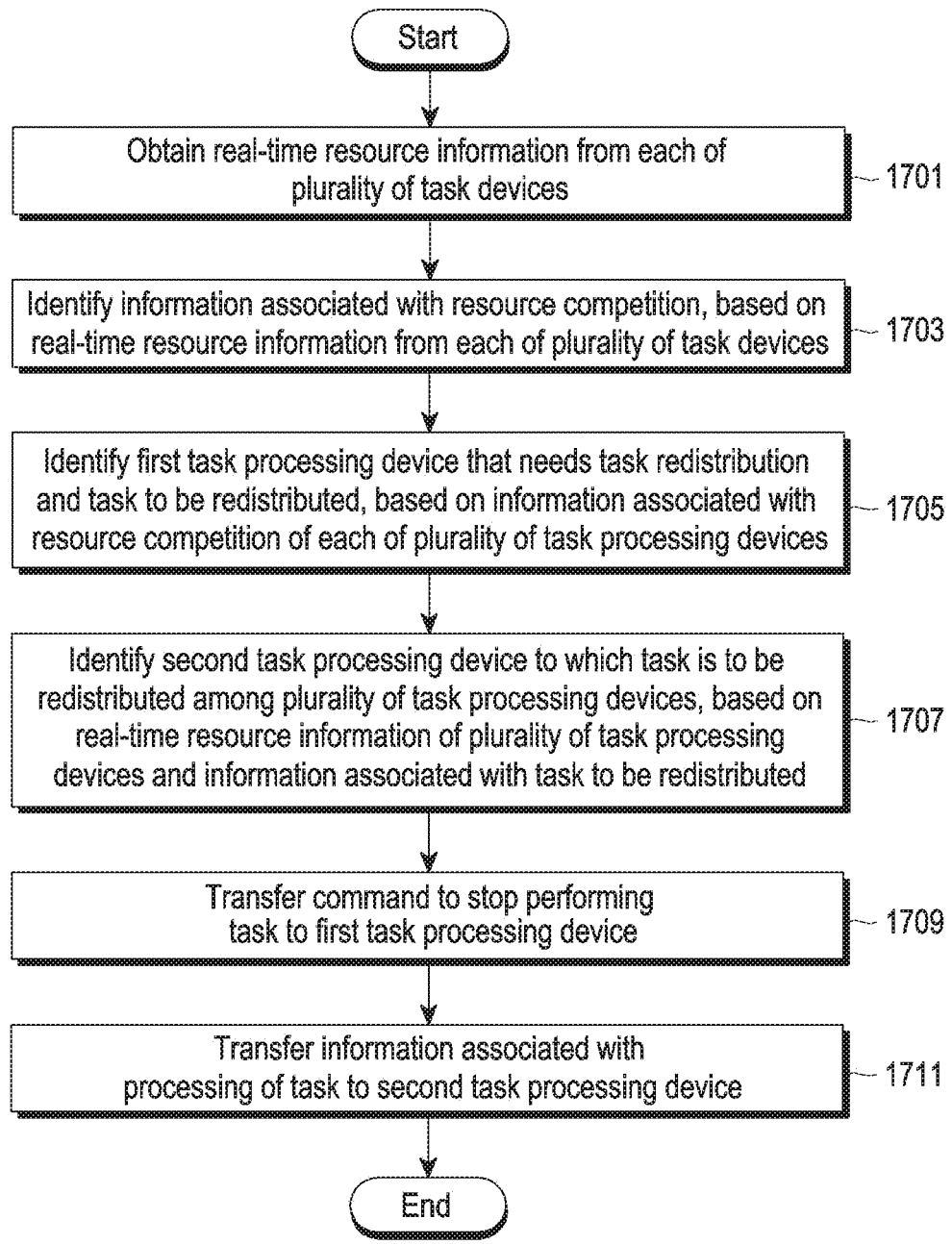
FIG. 17 is another flowchart illustrating an operation method of a master device according to embodiments of the disclosure.

FIG. 17 is another flowchart illustrating an operation method of a master device according to embodiments of the disclosure.

Referring to FIG. 17, the master device 100 may obtain real-time resource information from each of a plurality of task processing devices in operation 1701. In operation 1703, the master device 100 may identify information associated with resource competition on the basis of the real-time resource information from each of the plurality of task processing devices. In operation 1705, the master device 100 may identify a first task processing device that needs task redistribution among the plurality of task processing devices and a task to be redistributed on the basis of the information associated with resource competition of each of the plurality of task processing devices. In operation 1707, the master device 100 may identify a second task processing device to which the task is to be redistributed among the plurality of task processing devices on the basis of real-time resource information of the plurality of task processing devices and information associated with the task to be redistributed. In operation 1709, the master device 100 may transfer a command to suspend performing of the task to the first task processing device, and the first task processing device may stop performing the task on the basis of the command to suspend performing of the task. In operation 1711, the master device 100 may transfer information associated with processing of the task to the second task processing device. The second task processing device may initiate to perform the task and accordingly, task migration may be performed.

Figure 18:
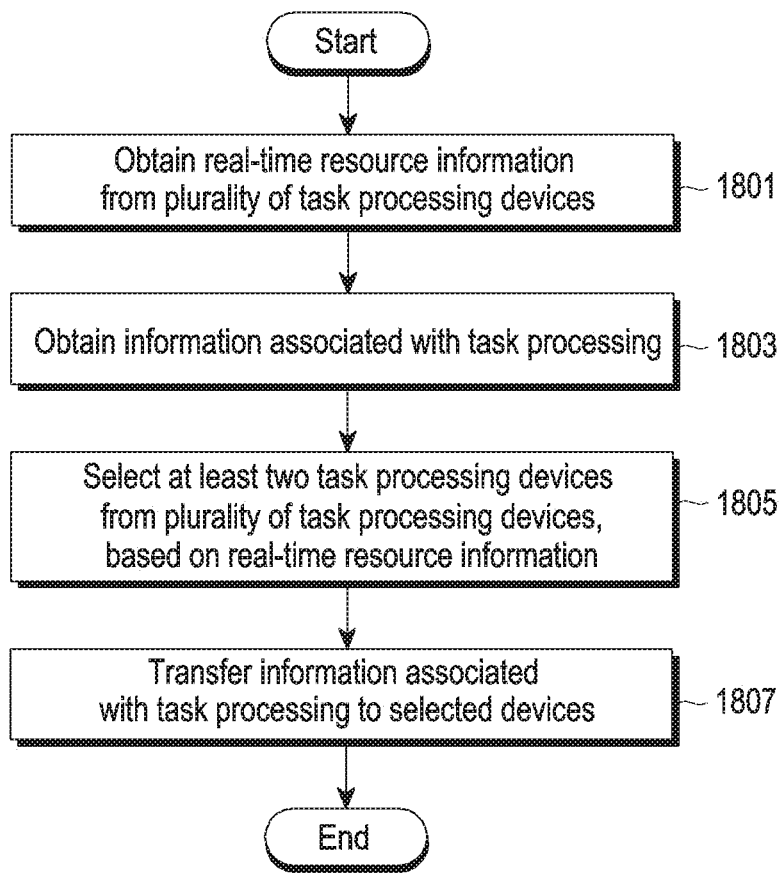
FIG. 18 is another flowchart illustrating an operation method of a master device according to embodiments of the disclosure.

FIG. 18 is another flowchart illustrating an operation method of a master device according to embodiments of the disclosure. The embodiment of FIG. 18 will be described in more detail with reference to FIGS. 19A and 19B.

Figure 19A:
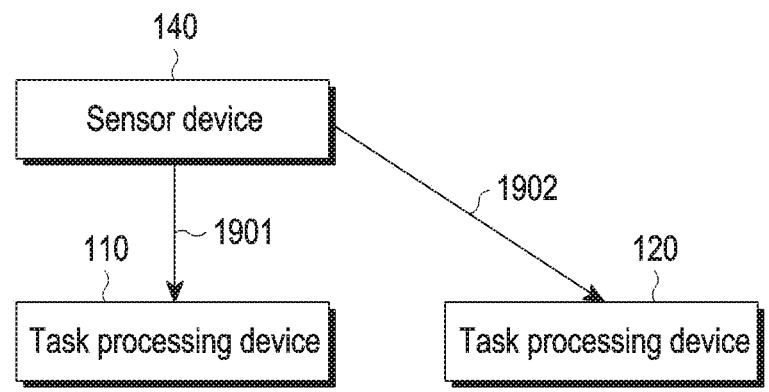
FIG. 19A is a diagram illustrating a plurality of task processing devices performing tasks according to embodiments of the disclosure.
Figure 19B:
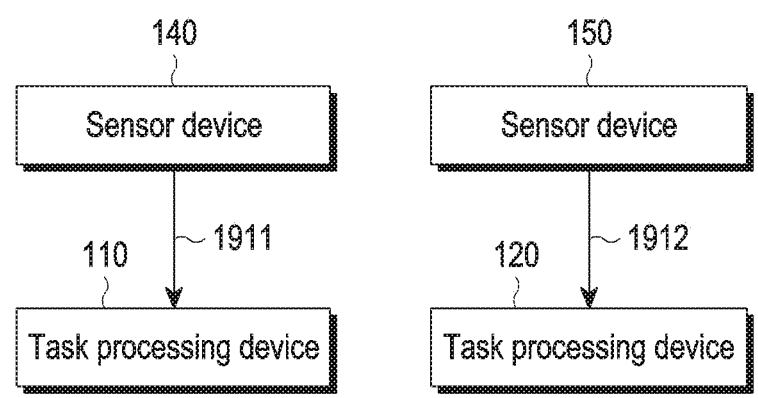
FIG. 19B is another diagram illustrating a plurality of task processing devices performing tasks according to embodiments of the disclosure.

FIG. 19A is a diagram illustrating a plurality of task processing devices performing tasks according to embodiments of the disclosure. FIG. 19B is another diagram illustrating a plurality of task processing devices performing tasks according to embodiments of the disclosure.

Referring to FIG. 18, the master device 100 may obtain real-time resource information from the plurality of task processing devices in operation 1801. In operation 1803, the master device 100 may obtain information associated with task processing. In operation 1805, the master device 100 may select at least two task processing devices from the plurality of task processing devices on the basis of the real-time resource information. For example, the master device 100 may select at least two task processing devices expected to have the degree of resource competition less than a threshold resource competition degree when processing a task. In operation 1807, the master device 100 may transfer information associated with task processing to the selected task processing devices. The at least two task processing devices that obtain the information associated with task processing may perform task processing.

Referring to FIG. 19A, the task may be a task for processing sensing data from the single sensor device 140. The master device 100 may determine to distribute the task to the task processing device 110 and the task processing device 120. The master device 100 may perform control at operation 1901 such that at least some of the sensing data from the sensor device 140 is processed by the task processing device 110, and at operation 1902 the remaining sensing data is processed by the task processing device 120.

Referring to FIG. 19B, the task may be a task for processing sensing data from the plurality of sensor devices 140 and 150. The master device 100 may perform control at operation 1911 such that the task processing device 110 processes sensing data from the sensor device 140 and at operation 1912 the task processing device 120 may process sensing data from the sensor device 150.

A master device or a task processing device according to various embodiments may be provided in one of the various forms of devices. A master device or task processing device may include, for example, a computer device, a portable communication device (e.g., a smart phone), a portable multimedia device, a portable medical device, a camera, a wearable device, or home appliances. However, a master device or task processing device according to embodiments of the disclosure are not limited to the above-described devices.

Embodiments and terms used therein should not limit the technical features of the disclosure to certain embodiments, but should include modifications, equivalents, or substitutes of the corresponding embodiments. As for the description of the drawings, like elements are indicated by like reference numerals. A noun corresponding to an item, which is provided in a singular form, may include one item or a plurality of items, unless otherwise indicated clearly in context. In the document, each of the phrases, "A or B", "at least one of A and B", "at least one of A or B", "A, B, or C", "at least one of A, B, and C", and "at least one of A, B, or C", may include one of the items arranged in a corresponding phrase or all possible combinations of the items. The expressions, "first", "second", and the like, in the document are used to distinguish one element from another, but the elements are not limited in other aspects (e.g., importance or order). If it is described that an element (e.g., a first element) is "coupled" or "connected" to another element (e.g., a second element) with the term "functionally" or "via communication", it means that the element is connected to the other element directly (e.g., wiredly), wirelessly, or via a third element.

The term "module" as used herein may include a unit consisting of hardware, software, firmware, or combinations thereof, and may, for example, be used interchangeably with the term "logic", "logical block", "component", "circuit", or the like. The "module" may be an integrated component, or a minimum unit for performing one or more functions or a part thereof. For example, the module may be implemented in the form of an application-specific integrated circuit (ASIC).

Embodiments disclosed herein may be implemented by software (e.g., program) including one or more instructions stored in a storage medium (e.g., internal memory or external memory) readable by a machine (e.g., master device or task execution device). For example, a processor of a machine (e.g., master device or task execution device) may call at least one of the stored instructions from the storage medium and execute the same. This makes it possible to operate the machine such that the machine performs at least one function according to the at least one called instruction. The at least one instruction may include a code which is generated by a compiler or a code which can be executed by an interpreter. The machine-readable storage media may be provided in the form of non-transitory storage media. Here, the term "non-transitory" only means that the storage media is a tangible device and does not include a signal, regardless of whether data is semi-permanently or temporarily stored in the storage medium.

The method according to embodiments of the disclosure disclosed herein may be included and provided in a computer program product. The computer program product may be traded as a product between a seller and a buyer, or the computer program product may be distributed in the form of a machine-readable storage medium (e.g., compact disc read only memory (CD-ROM)), or may be distributed online via an application store (e.g., Play Store™) or directly between two user devices (e.g., smartphones). If distributed online, at least part of the computer program product may be temporarily generated or at least temporarily stored in the machine-readable storage medium, such as memory of the manufacturer's server, a server of the application store, or a relay server.

According to embodiments of the disclosure, each of the above-described elements (e.g., modules or programs) may include a single entity or a plurality of entities. According to embodiments of the disclosure, one or more elements of the above-described elements or operations thereof may be omitted, or one or more other elements or operations thereof may be added. Alternatively or additionally, a plurality of elements (e.g., modules or programs) may be integrated into a single element. In this instance, the integrated element may perform one or more functions of each of the plurality of elements, which are equivalent or similar to the functions performed by a corresponding element of the plurality of elements before integration. According to embodiments of the disclosure, operations performed by a module, a program, or other elements may be performed in parallel, repetitively, or heuristically, may be performed in a different order, may be omitted, or one or more other operations may be added.

While the disclosure has been shown and described with reference to embodiments thereof, it will be understood by those skilled in the art that various changes in form and detail may be made therein without departing from the spirit and scope of the disclosure as defined by the appended claims and their equivalents.

What is claimed is:

1. A master device for managing task processing of a plurality of task processing devices, the device comprising:
    a communication circuit; and
    at least one processor, wherein the at least one processor is configured to:
        control the communication circuit to obtain first real-time resource information associated with resources that a first task processing device currently uses from the first task processing device among the plurality of task processing devices,
        control the communication circuit to obtain second real-time resource information associated with resources that a second task processing device currently uses from the second task processing device among the plurality of task processing devices,
        obtain information associated with processing of a task to be distributed to at least one of the plurality of task processing devices,
        obtain an amount of resources required for processing the task, wherein the amount of resources required is identifiable by processing the task on the basis of the information associated with processing of the task,
        identify the first task processing device to be a task processing device to which the task is to be distributed among the first task processing device and the second task processing device on the basis of the first real-time resource information, the second real-time resource information, and the amount of resources required for processing the task, and
        control the communication circuit to transmit the information associated with processing of the task to the first task processing device, and
    wherein, as at least a part of the processing of the task on the basis of the information associated with the processing of the task and the obtaining of the amount of resources required for processing the task, the at least one processor is further configured to:
        process the task using only at least one central processing unit (CPU) among the at least one processor and obtain a first resource amount which is required for processing the task: and
        process the task using the at least one CPU and at least one graphics processing unit (GPU) among the at least one processor and obtain a second resource amount which is required for processing the task.

2. The master device of claim 1, wherein, as at least a part of the obtaining of the amount of resources required for processing the task, the at least one processor is further configured to:
    provide the information associated with processing of the task to at least one of the plurality of task processing devices or an external electronic device and obtain the amount of resources required for processing the task, wherein the amount of resources required is identifiable by processing, by the at least one of the plurality of task processing devices or the external electronic device, the task on the basis of the information associated with processing of the task.

3. The master device of claim 1, wherein, as at least a part of the processing of the task on the basis of the information associated with processing of the task and the obtaining of the amount of resources required for processing the task, the at least one processor is further configured to:
    based on at least a part of the second resource amount satisfying a designated condition, distribute the task to a task processing device including a GPU; and
    based on at least a part of the second resource amount not satisfying the designated condition, distribute the task to a task processing device excluding a GPU.

4. The master device of claim 3, wherein the at least one processor is further configured to:
    identify the task processing device including a GPU to which the task is to be distributed among a plurality of task processing devices including GPUs on the basis of the second resource amount, the first real-time resource information, and the second real-time resource information, as at least a part of the distributing of the task to the task processing device including a GPU; and
    identify the task processing device excluding a GPU to which the task is to be distributed among a plurality of task processing devices excluding a GPU on the basis of the first resource amount, the first real-time resource information, and the second real-time resource information, as at least a part of the distributing of the task to the task processing device excluding a GPU.

5. The master device of claim 1, wherein the at least one processor is further configured to:
    identify an updated amount of resources required for processing the task on the basis of detecting of an event for re-identifying the amount of resources required for processing the task;
    control the communication circuit to obtain third real-time resource information associated with the resources that the first task processing device currently uses from the first task processing device;
    control the communication circuit to obtain fourth real-time resource information associated with the resources that the second task processing device currently uses from the second task processing device; and
    re-identify the task processing device to which the task is to be distributed among the first task processing device and the second task processing device on the basis of the updated amount of resources required for processing the task, the third real-time resource information, and the fourth real-time resource information.

6. The master device of claim 1, wherein the at least one processor is further configured to:
    control the communication circuit to obtain from the first task processing device, fifth real-time resource information associated with the resources that the first task processing device currently uses and resource information associated resources used by at least one task that the first task processing device currently processes, after transmitting the information associated with processing of the task to the first task processing device; and
    redistribute at least a part of the at least one task to the second task processing device identified using real-time resource information associated with resources that the plurality of task processing devices currently use and the resource information associated with resources used by the at least one task on the basis of identifying that competition for resources occurs in the first task processing device using the fifth real-time resource information.

7. The master device of claim 6, wherein, as at least a part of the identifying that the competition for resources occurs in the first task processing device using the fifth real-time resource information, the at least one processor is further configured to:
identify that the competition for resources occurs in the first task processing device based on a difference between at least a part of the fifth real-time resource information and at least a part of real-time resource information obtained before the fifth real-time resource information is obtained; or
identify that the competition for resources occurs in the first task processing device based on at least a part of the fifth real-time resource information.

8. The master device of claim 6, wherein, as at least a part of the redistributing of at least a part of the at least one task to the second task processing device, the at least one processor is further configured to:
redistribute at least the part of the at least one task on the basis of at least one of the resource information associated with resources used by the at least one task or a variation in the resource information associated with resources used by the at least one task.

9. The master device of claim 6, wherein, as at least a part of the redistributing of at least the part of the at least one task to the second task processing device, the at least one processor is further configured to:
select the second task processing device which is expected to have a lowest degree of competition for resources when processing at least the part of the at least one task from among a plurality of task processing devices having an amount of idle resources which is greater than an amount of used resources corresponding to real-time resource information of at least the part of the at least one task.

10. The master device of claim 6, wherein the at least one processor is further configured to:
control the communication circuit to transmit, to the first task processing device, a signal that suspends processing of at least the part of the at least one task; and
control the communication circuit to transmit, to the second task processing device, information for processing at least the part of the at least one task.

11. The master device of claim 1, wherein, as at least a part of the identifying of the first task processing device to be the task processing device to which the task is to be distributed, the at least one processor is further configured to:
identify the first task processing device to be the task processing device to which the task is to be distributed based on a degree of competition for resources of the first task processing device expected when performing the task being lower than a degree of competition for resources of the second task processing device expected when performing the task.

12. The master device of claim 1,
wherein the first real-time resource information and the second real-time resource information comprise at least one of CPU usage information and GPU usage information,
wherein the CPU usage information is determined based on at least one of a last level cache (LLC) hit ratio or a main memory bandwidth, and wherein the GPU usage information is determined based on at least one of a GPU occupancy (GO) or a GPU memory bandwidth.

13. A method for managing task processing of a plurality of task processing devices by a master device, the method comprising:
controlling a communication circuit of the master device to obtain first real-time resource information associated with resources that a first task processing device currently uses from the first task processing device among the plurality of task processing devices;
controlling the communication circuit to obtain second real-time resource information associated with resources that a second task processing device currently uses from the second task processing device among the plurality of task processing devices;
obtaining information associated with processing of a task that is to be distributed to at least one of the plurality of task processing devices;
obtaining an amount of resources required for processing the task, wherein the amount of resources required is identifiable by processing the task on the basis of the information associated with processing of the task;
identifying the first task processing device to be a task processing device to which the task is to be distributed among the first task processing device and the second task processing device on the basis of the first real-time resource information, the second real-time resource information, and the amount of resources required for processing the task; and
controlling the communication circuit to transmit the information associated with processing of the task to the first task processing device,
wherein the obtaining of the amount of resources required for processing the task comprises:
processing the task using only at least one central processing unit (CPU) among at least one processor and obtaining a first resource amount which is required for processing the task; and
processing the task using the at least one CPU and at least one graphics processing unit (GPU) among the at least one processor and obtaining a second resource amount which is required for processing the task.

14. The method of claim 13, wherein the obtaining of the amount of resources required for processing the task comprises:
providing the information associated with processing of the task to at least one of the plurality of task processing devices or an external electronic device and obtaining the amount of resources required for processing the task, wherein the amount of resources required is identifiable by processing, by the at least one of the plurality of task processing devices or the external electronic device, the task on the basis of the information associated with processing of the task.

15. The method of claim 13, further comprising:
identifying an updated amount of resources required for processing the task on the basis of detecting of an event for re-identifying the amount of resources required for processing the task;
controlling the communication circuit to obtain third real-time resource information associated with the resources that the first task processing device currently uses from the first task processing device;
controlling the communication circuit to obtain fourth real-time resource information associated with the resources that the second task processing device currently uses from the second task processing device; and re-identifying the task processing device to which the task is to be distributed among the first task processing device and the second task processing device on the basis of the updated amount of resources required for processing the task, the third real-time resource information, and the fourth real-time resource information.

16. The method of claim 13, further comprising:

controlling the communication circuit to obtain, from the first task processing device, fifth real-time resource information associated with the resources that the first task processing device currently uses and resource information associated with resources used by at least one task that the first task processing device currently processes after transmitting the information associated with processing of the task to the first task processing device; and redistributing at least a part of the at least one task to the second task processing device identified using real-time resource information associated with resources that the plurality of task processing devices currently uses and the resource information associated with resources used by the at least one task on the basis of identifying that competition for resources occurs in the first task processing device using the fifth real-time resource information.

17. The method of claim 16, further comprising:

controlling the communication circuit to transmit, to the first task processing device, a signal that suspends processing of at least the part of the at least one task; and controlling the communication circuit to transmit, to the second task processing device, information for processing at least the part of the at least one task.

18. The method of claim 13, wherein the identifying of the first task processing device to be the task processing device to which the task is to be distributed comprises:

identifying the first task processing device to be the task processing device to which the task is to be distributed on the basis of a degree of competition for resources of the first task processing device expected when performing the distributed task being lower than a degree of competition for resources of the second task processing device expected when performing the task.

* * * * *